United States Patent
Kobayashi

(10) Patent No.: US 8,068,389 B2
(45) Date of Patent: Nov. 29, 2011

(54) TRACKING ERROR SIGNAL DETECTION DEVICE AND OPTICAL DISC APPARATUS

(75) Inventor: Nobuyoshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 708 days.

(21) Appl. No.: 12/138,037

(22) Filed: Jun. 12, 2008

(65) Prior Publication Data

US 2009/0003167 A1    Jan. 1, 2009

(30) Foreign Application Priority Data

Jun. 29, 2007    (JP) .................................. 2007-171689

(51) Int. Cl.
*G11B 7/00* (2006.01)
(52) U.S. Cl. ..................................................... 369/44.25
(58) Field of Classification Search ........................ None
See application file for complete search history.

(56) References Cited

U.S. PATENT DOCUMENTS

2008/0019469 A1 *    1/2008    Shiraishi .................... 369/44.39

* cited by examiner

*Primary Examiner* — Wayne Young
*Assistant Examiner* — Brian Butcher
(74) *Attorney, Agent, or Firm* — SNR Denton US LLP

(57) ABSTRACT

A tracking error signal detection device employing a differential phase detection method includes first and second differentiators which remove direct current components in first and second signal groups in which a phase difference between the first and second signal groups changes in accordance with a tracking error signal, and which differentiate the first and second signal groups, first and second analog/digital converters which sample and quantize signals output from the first and second differentiators, respectively, a Hilbert transformer performing a 90-degree phase shift on one of signals output from the first and second analog/digital converters, a delay circuit delaying one of the signals output from the second and first analog/digital converters by an amount of delay equal to that caused by the Hilbert transformer, and a phase comparator calculating a phase difference between a signal output from the Hilbert transformer and a signal output from the delay circuit.

13 Claims, 12 Drawing Sheets

| TAP NUMBER | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| TAP COEFFICIENT | 0 | -2 | -3 | -3 | -11 | 6 | -18 | 50 | 64 | -50 | -18 | -6 | -11 | 3 | -3 | 2 | 0 |

| TAP NUMBER | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| TAP COEFFICIENT | 0 | 2 | -3 | 3 | -11 | -6 | -18 | -50 | 64 | 50 | -18 | 6 | -11 | -3 | -3 | -2 | 0 |

| TAP NUMBER | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| TAP COEFFICIENT | 0 | -3 | 0 | -4 | 0 | 9 | 0 | 74 | 0 | -74 | 0 | -9 | 0 | 4 | 0 | 3 | 0 |

| TAP NUMBER | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| TAP COEFFICIENT | 0 | 0 | -5 | 0 | -16 | 0 | -27 | 0 | 96 | 0 | -27 | 0 | -16 | 0 | -5 | 0 | 0 |

# TRACKING ERROR SIGNAL DETECTION DEVICE AND OPTICAL DISC APPARATUS

CROSS REFERENCES TO RELATED APPLICATIONS

The present invention contains subject matter related to Japanese Patent Application JP 2007-171689 filed in the Japanese Patent Office on Jun. 29, 2007, the entire contents of which are incorporated herein by reference.

BACKGROUND OF THE INVENTION

1. Field of the Invention

The present invention relates to a tracking error (TE) detection device using a DPD (differential phase detection) method which is employed in an optical disc apparatus, for example, and the optical disc apparatus.

2. Description of the Related Art

In general, optical controllers include TE (tracking error) detection devices (circuits) employing DPD methods in order to generate tracking error signals in ROM discs. The TE detection devices employing the DPD methods are currently realized by analog circuits which operate at high speed and which have high accuracies (refer to Japanese Patent No. 3336778, Japanese Unexamined Patent Application Publication No. 57-191839, Japanese Unexamined Patent Application Publication No. 57-181433, Japanese Unexamined Patent Application Publication No. 63-148433, Japanese Unexamined Patent Application Publication No. 07-296395, Japanese Unexamined Patent Application Publication No. 63-131334, Japanese Patent No. 3065993, Japanese Patent No. 3439393, Japanese Unexamined Patent Application Publication No. 2006-260645, and Japanese Patent No. 3769888, for example)

In response to recent development of a system LSI (large-scale integration) technique, a technique of integrating analog signal processing and digital signal processing so that the analog signal processing and the digital signal processing are performed using an identical chip has been developed. This technique is also applied to controller chips of optical discs. In response to such development of digital signal processing, there are strong demands for integrations in order to obtain digital chips in TE detection devices employing DPD methods.

To meet such demands, three techniques will be described hereinafter as first to third examples.

FIRST EXAMPLE

According to the first example, a DPD circuit designed by an analog circuit is mounted "as it is" on a digital chip in a mixed manner by an analog circuit technique.

Specifically, as disclosed in the patent documents listed above, a high-frequency boost circuit (equalizer), a binarizer (slicer), and an edge-comparison type phase comparator which constitute a configuration generally used are implemented on a digital chip by the analog circuit technique.

In this case, the required number of high-frequency boost circuits (equalizers) and the required number of binarizers (slicers) correspond to the number of calculation channels of the DPD circuit (2 or 4).

The high-frequency boost circuit (equalizer) is not necessarily provided in terms of differential phase detection. However, the high-frequency boost circuit is necessary for performing proper binarization when the edge comparison type phase comparator is employed.

The binarizer (slicer) and the edge comparison type phase comparator are used to suppress a change of TE sensitivity which relies on RF (radio frequency) amplitude. The sensitivity relative to an amplitude change is suppressed by detecting phase differences at edges.

The edge comparison type phase comparator should include a mechanism capable of removing noise and removing false edges and chattering which are generated due to deterioration of a high-frequency characteristic (f-characteristic), the noise, and asymmetry, for example, which are caused by skew and defocus (a change of an OTF (optical transfer function)) so that a practical TE sensitivity is obtained. Therefore, the edge removing mechanism is realized so as to have a configuration of an asynchronous feedback circuit.

SECOND EXAMPLE

A technique employing an analog correlation detection method disclosed in Japanese Unexamined Patent Application Publication No. 57-191839 is taken as the second example.

In the second example, a full analog circuit including a 90-degree phase shifter, a multiplier, and an LPF (low-pass filter) is employed.

In the first example described above, after the binarization is appropriately performed, phase comparison of edges is performed. However, in the second example, after the binarization is appropriately performed, phase comparison (correlation calculation) of waveforms is performed. Therefore, in the technique according to the second example, a large high-frequency boost circuit is basically not necessary.

Since the edge comparison type phase comparator is not employed in the technique according to the second example, the mechanism of removing false edges and chattering which has a configuration of an asynchronous feedback loop circuit is not necessary.

THIRD EXAMPLE

A technique of replacing a DPD circuit which is generally used and which is realized by a high-speed analog circuit by a digital signal processing circuit is taken as the third example (refer to Japanese Patent No. 3439393 and Japanese Unexamined Patent Application Publication No. 2006-260645, for example).

In this technique, an A/D converter, a high-frequency boost and compensation circuit, a zero-crossing generator, and a zero-crossing phase comparator are provided and operate in this order. A configuration of the third example is obtained by replacing the analog processing system of the first example by a digital signal processing system.

SUMMARY OF THE INVENTION

The high-frequency boost circuit (equalizer) used in the first example described above is configured using a high-order transfer function, and therefore, there arises problems in that a circuit size thereof is large, element sensitivity is high, and the high-frequency boost circuit is not suitable for an analog circuit employing a fine CMOS process having large variation.

Furthermore, when a full seeking operation is performed from the innermost circumference to the outermost circumference, for example, and when a frequency of the RF is considerably changed, a pole and a zero point of the transfer function should be changed in accordance with the frequency change. However, it is difficult to perform this operation accurately.

Since the phase comparator has a configuration of an asynchronous feedback circuit, a limit of an operation speed of the phase comparator depends on gate delay time which considerably changes in accordance with a processing factor, temperature, and a power supply condition. Furthermore, although the phase comparator includes a digital gate, the phase comparator is incapable of performing timing control (static timing analysis: STA) utilizing a clock synchronization design which is used in general digital circuits, and therefore, it is difficult to ensure a high-speed stable operation.

Moreover, with this configuration, there arise fundamental problems in that process shrink of analog circuit blocks has not yet caught up with process shrink of digital circuit blocks caused by advancing development of microfabrication processes of semiconductors.

Specifically, the following problems arise:
(1) Increase in variation of a threshold value Vth due to microfabrication and increase in a channel width W of a MOS transistor for suppressing the increase in variation of the threshold value Vth;
(2) Deterioration of an equivalent output resistance Ro of a MOS transistor due to microfabrication and increase in a channel width W for compensating for deterioration of the equivalent output resistance Ro and realizing a value of gm which ensures a gain; and
(3) Reduction of a power supply voltage due to microfabrication, increase in a channel width W for compensating for the reduction of the power supply voltage and supplying an amount of current necessary for ensuring a dynamic range, and necessity of employment of a aliasing circuit.

These problems (1), (2), and (3) cause increase in a transistor size (relative size) and increase in current consumption. Therefore, even though a process shrink technology has been developed, an implementation area and power consumption of the analog circuit have negligibly shrunk.

Therefore, as microfabrication processes continue to develop, the implementing area of the analog circuit occupies a relatively large area of a chip and the power consumption of the analog circuit becomes dominant in total power consumption of the chip.

Since a cost per area is high in the microfabrication process, the first example has a disadvantage in terms of cost.

Accordingly, it is not appropriate to employ the approach from the first example.

As described above, since the edge comparison type phase comparator is not employed in the technique according to the second example, the system of removing false edges and chattering which has an asynchronous feedback loop configuration is not necessary.

Therefore, unlike the technique according to the first example, the technique according to the second example avoids the problem affecting an operation speed caused by data delay time and timing control.

However, since the correlation detection method is employed, output sensitivity relative to input amplitude has a square-law characteristic. Therefore, there arises a problem in that the TE sensitivity considerably changes in accordance with the amplitude and a frequency characteristic (f-characteristic) of a signal.

To address this problem, a technique using a limiter has been proposed (refer to Japanese Unexamined Patent Application Publication Nos. 57-181433 and 63-148433, for example). However, in this technique using a limiter, although generation of a component due to amplitude change is suppressed using the limiter, a component generated due to change of the f-characteristic is not removed. Furthermore, since the problem does not relate to an absolute value but relates to a change of the component generated due to the change of the f-characteristic when the a high-frequency boost circuit is additionally provided, this problem is not solved.

Furthermore, judging from the nature of the tracking error detection circuit, an automatic gain control (AGC) circuit having a feedback loop and a large time constant is not additionally provided, since the presence of the automatic gain control (AGC) circuit makes it difficult to properly operate a tracking servo system. Even if a feed forward AGC circuit which does not include a feedback loop is employed, it is difficult to realize a normalization circuit (divider) having an optimum and practical circuit size using an analog technique.

Furthermore, a phase shift circuit which precisely attains a 90-degree phase difference is necessary for the correlation detection method. Failure of accurate phase shift causes a shift of the origin of a TE signal and a shift of tracks.

Moreover, since input RF signals are an aggregate of a random sequence, a 90-degree phase shift should be precisely performed on a DC frequency (0 Hz) to a Nyquist frequency (fs/2) including spectrum of the random sequence irrespective of a signal cycle. However, it is not physically possible to properly realize such a characteristic in an analog circuit in terms of causality. Japanese Unexamined Patent Application Publication Nos. 57-191839 and 07-296395 do not disclose a method for realizing such a characteristic.

Alternatively, a technique of attaining a 90-degree phase difference using a specific frequency by equivalently adding a delay circuit having a constant value has been proposed (refer to Japanese Unexamined Patent Application Publication No. 63-131334 and Japanese Patent No. 3065993, for example).

However, since the RF signals are an aggregate of a random sequence, a phase of a frequency higher than the specific frequency is delayed and a phase of a frequency lower than the specific frequency is advanced. Specifically, since a center of a TE corresponding to the phase of a frequency higher than the specific frequency and a center of a TE corresponding to the phase of a frequency lower than the specific frequency shift in directions opposite to each other, an amount of delay is controlled so that shifts of the centers of the TEs becomes zero. The shifts of the centers are determined by not only occurrence probabilities in periods included in the RF signal but also a balance between f-characteristics and a balance between channels. Accordingly, it is difficult to properly perform this controlling process. In addition, when a full seeking operation is performed from the innermost circumference to the outermost circumference, it is difficult to cope with a change of a frequency of the RF signal. Therefore, a practical TE detection circuit is not attained by the technique disclosed in the Unexamined Patent Application Publication No. 63-131334 and Japanese Patent No. 3065993.

Furthermore, since the analog multiplier utilizes an equivalent emitter resistance, the analog multiplier exhibits large variation in an output offset and large temperature drift. Therefore, a problem arises in implementation in that when the variation of an output offset and the temperature drift are suppressed to the extent of practical levels of the tracking servo system, a transistor size and a chip area become considerably large.

Since the TE detection circuit should have DC components, a DC servo circuit, for example, for suppressing offset may not be employed.

Accordingly, this alternative approach is not employed due to various disadvantages described above. Therefore, recent DPD circuits of analog configurations generally employ the technique according to the first example.

Moreover, since the TE detection circuit employs an analog method, the fundamental problems (1), (2), and (3) described above in association with the first example are not avoidable. Accordingly, in terms of cost of a fine CMOS process, it is difficult to employ the approach from the second example.

According to the third example, an area of the digital signal processing circuit may be shrunk as the microfabrication techniques continue to develop.

However, in this approach, two to four A/D converters capable of operating at high speed with high resolution are necessary.

The required number of the A/D converters is determined by the number of calculation channels of the DPD, and four channels are necessary. This is a recent mainstream configuration. For example, in "Blu-ray disc (trademark)" which is a representative standard among high-density optical discs, a pit depth of a ROM disc is set to λ/6 so that a reproducing compatibility of a drive (optical disc driving device) employing a TE detection of a DPP (differential push pull) method is ensured while push-pull signal levels are ensured.

Therefore, origin shift (offset) is generated in a DPD_TE signal (refer to Japanese Patent No. 3769888, for example). To eliminate the origin shift and to cancel influence of a lens shift of an optical pickup, a four-channel DPD calculation method is necessary.

A signal supplied to the DPD circuit is a RF band signal having a high S/N ratio, and the signal should be subjected to linear digital signal processing which is a series of operations, that is, a high-frequency boost operation, a compensation operation, and a zero-cross generation. When amplitude limiting is performed, a zero cross generated after the compensation operation is shifted, and accordingly, reduction of the number of quantization bits utilizing an over-scale limit effect is not performed.

Therefore, an A/D converter which has high resolution similar to an A/D converter used in a read channel (Viterbi decoding, for example) is necessary, that is, a resolution of approximately 4 to 6 bits is necessary.

Furthermore, judging from the nature of the tracking error detection circuit, the full seeking operation performed from the innermost circumference to the outermost circumference of the disc should properly function. Accordingly, the A/D converter should operate with a sampling frequency higher than an RF channel frequency so that aliasing is prevented from being generated even when the full seeking operation is performed.

Specifically, in recent high-density optical disc devices, channel codes limited by d=1 are employed, and a maximum repeat frequency is 2T (=fcck/4, fcck: channel clock frequency). Moreover, a rate of linear speeds in the innermost circumference and in the outer circumference is approximately 2.4 times (in a case of a 12-cm disc). Furthermore, errors of the linear speeds should be taken into consideration. Accordingly, the A/D converter should operate with a sampling frequency 1.2 times larger the channel clock frequency.

As described above, A/D converters which operate at high speed with high resolution are necessary for four channels and these A/D converters are realized by a high-speed high-accuracy analog circuit technique. Therefore, according to the problems (1), (2), and (3) described above in association with the first example, as microfabrication techniques for semiconductors continue to develop, an implementing area of the A/D circuit occupies a relatively large area of a chip and the power consumption of the A/D circuit becomes dominant in total power consumption of the chip. Accordingly, in terms of cost of a fine CMOS process, it is difficult to employ the approach from the third example.

It is desirable to provide a tracking error signal detection device capable of realizing a device employing a DPD method as a digital circuit which operates at high speed with high accuracy and an optical disc apparatus.

According to an embodiment of the present invention, there is provided a tracking error signal detection device employing a differential phase detection method, including first and second differentiators which remove direct current components included in first and second signal groups in which a phase difference between the first and second signal groups changes in accordance with a tracking error signal, and which differentiate the first and second signal groups, a first analog/digital converter which samples and quantizes a signal output from the first differentiator, a second analog/digital converter which samples and quantizes a signal output from the second differentiator, a Hilbert transformer which performs a 90-degree phase shift on a signal output from the first analog/digital converter or a signal output from the second analog/digital converter irrespective of a cycle of a signal component, a delay circuit which delays the signal output from the second analog/digital converter or the signal output from the first analog/digital converter by an amount of delay equal to that caused by the Hilbert transformer, and a phase comparator which calculates a phase difference between a signal output from the Hilbert transformer and a signal output from the delay circuit.

According to another embodiment of the present invention, there is provided a tracking error signal detection device employing a differential phase detection method, including first and second differentiators which remove direct current components included in first and second signal groups in which a phase difference between the first and second signal groups changes in accordance with a tracking error signal, and which differentiate the first and second signal groups, a first analog/digital converter which samples and quantizes a signal output from the first differentiator, a second analog/digital converter which samples and quantizes a signal output from the second differentiator, a first Hilbert transformer which performs a 90-degree phase shift on a signal output from the first analog/digital converter irrespective of a cycle of a signal component, a first delay circuit which delays the signal output from the first analog/digital converter by an amount of delay equal to that caused by the first Hilbert transformer, a second Hilbert transformer which performs a 90-degree phase shift on a signal output from the second analog/digital converter irrespective of a cycle of a signal component, a second delay circuit which delays the signal output from the second analog/digital converter by an amount of delay equal to that caused by the second Hilbert transformer, a first cross-correlator which calculates a cross-correlation between a signal output from the first Hilbert transformer and a signal output from the first delay circuit, a second cross-correlator which calculates a cross-correlation between a signal output from the second Hilbert transformer and a signal output from the second delay circuit, and a subtractor which performs a subtraction operation using a signal output from the first cross-correlator and a signal output from the second cross-correlator.

According to still another embodiment of the present invention, there is provided a tracking error signal detection device employing a differential phase detection method, including first to fourth differentiators which remove direct current components included in first to fourth signal groups in which phase differences among the first to fourth signal groups change in accordance with a tracking error signal, and which differentiate the first to fourth signal groups, a first analog/digital converter which samples and quantizes a signal output from the first differentiator, a second analog/digital converter which samples and quantizes a signal output from the second differentiator, a third analog/digital converter which samples and quantizes a signal output from the third differentiator, a fourth analog/digital converter which samples and quantizes a signal output from the fourth differentiator, a first Hilbert transformer which performs a 90-degree phase shift on a signal output from the first analog/digital converter or a signal output from the second analog/digital converter irrespective of a cycle of a signal component, a second Hilbert transformer which performs a 90-degree phase shift on a signal output from the third analog/digital converter or a signal output from the fourth analog/digital converter irrespective of a cycle of a signal component, a first delay circuit which delays the signal output from the second analog/digital converter or the signal output from the first analog/digital converter by an amount of delay equal to that caused by the Hilbert transformer, a second delay circuit which delays the signal output from the fourth analog/digital converter or the signal output from the third analog/digital converter by an amount of delay equal to that caused by the Hilbert transformer, a first cross-correlator which calculates a phase difference between a signal output from the first Hilbert transformer and a signal output from the first delay circuit, a second cross-correlator which calculates a phase difference between a signal output from the second Hilbert transformer and a signal output from the second delay circuit, and an adder which adds a signal output from the first cross-correlator to a signal output from the second cross-correlator.

According to a further embodiment of the present invention, there is provided A tracking error signal detection device employing a differential phase detection method, including first to fourth differentiators which remove direct current components included in first to fourth signal groups in which phase differences among the first to fourth signal groups change in accordance with a tracking error signal, and which differentiate the first to fourth signal groups, a first analog/digital converter which samples and quantizes a signal output from the first differentiator, a second analog/digital converter which samples and quantizes a signal output from the second differentiator, a third analog/digital converter which samples and quantizes a signal output from the third differentiator, a fourth analog/digital converter which samples and quantizes a signal output from the fourth differentiator, a first Hilbert transformer which performs a 90-degree phase shift on a signal output from the first analog/digital converter irrespective of a cycle of a signal component, a second Hilbert transformer which performs a 90-degree phase shift on a signal output from the second analog/digital converter irrespective of a cycle of a signal component, a third Hilbert transformer which performs a 90-degree phase shift on a signal output from the third analog/digital converter irrespective of a cycle of a signal component, a fourth Hilbert transformer which performs a 90-degree phase shift on a signal output from the fourth analog/digital converter irrespective of a cycle of a signal component, a first delay circuit which delays the signal output from the first analog/digital converter by an amount of delay equal to that caused by the first Hilbert transformer, a second delay circuit which delays the signal output from the second analog/digital converter by an amount of delay equal to that caused by the second Hilbert transformer, a third delay circuit which delays the signal output from the third analog/ digital converter by an amount of delay equal to that caused by the third Hilbert transformer, a fourth delay circuit which delays the signal output from the fourth analog/digital converter by an amount of delay equal to that caused by the fourth Hilbert transformer, a first cross-correlator which calculates a cross-correlation between a signal output from the first Hilbert transformer and a signal output from the second delay circuit, a second cross-correlator which calculates a cross-correlation between a signal output from the second Hilbert transformer and a signal output from the first delay circuit, a third cross-correlator which calculates a cross-correlation between a signal output from the third Hilbert transformer and a signal output from the fourth delay circuit, a fourth cross-correlator which calculates a cross-correlation between a signal output from the fourth Hilbert transformer and a signal output from the third delay circuit, a first subtractor which calculates a difference between a signal output from the first cross-correlator and a signal output from the second cross-correlator, a second subtractor which calculates a difference between a signal output from the third cross-correlator and a signal output from the fourth cross-correlator, and an adder which adds a signal output from the first subtractor to a signal output from the second subtractor.

An optical disc apparatus according to an embodiment of the present invention includes one of the tracking error signal detection devices described above.

Accordingly, a tracking error signal detection device employing a DPD method is realized as a digital circuit which operates at high speed and with high accuracy.

DESCRIPTION OF THE PREFERRED EMBODIMENTS

Embodiments of the present invention will be described hereinafter with reference to the accompanying drawings.

First Embodiment

Figure 1:
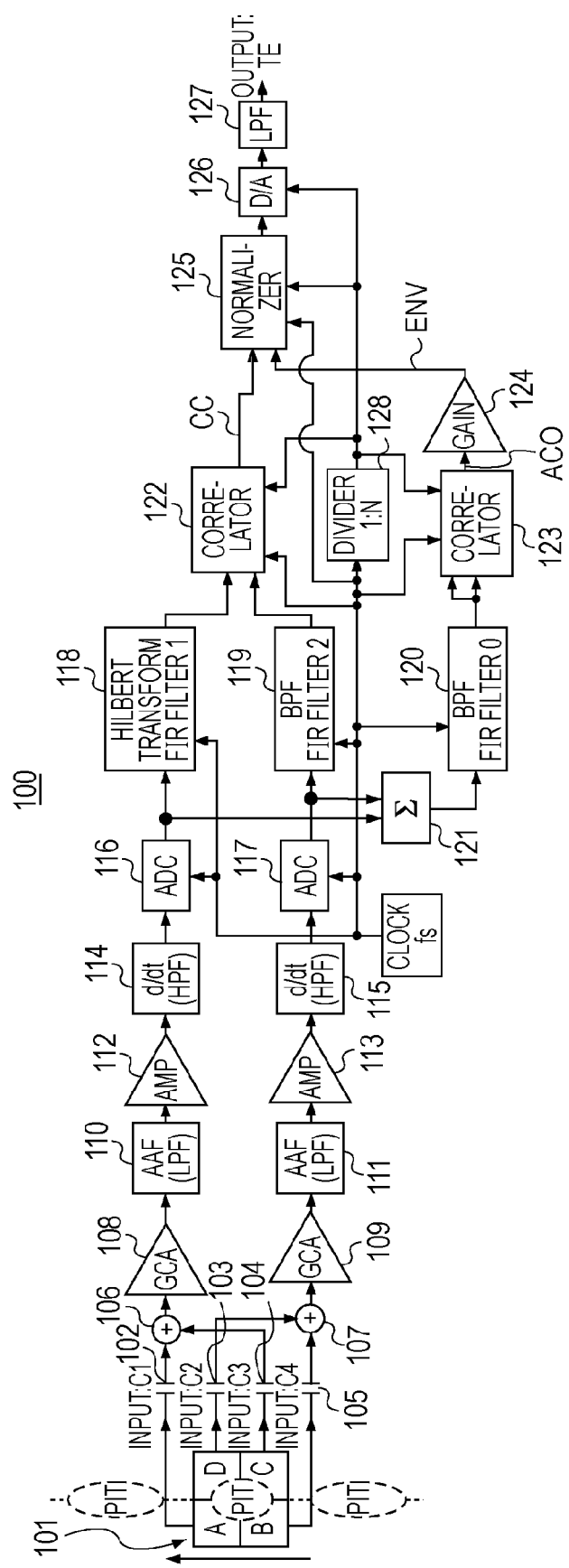
FIG. 1 is a circuit diagram illustrating a configuration of a tracking error (TE) detection device employing a DPD method according to a first embodiment of the present invention.

FIG. 1 is a circuit diagram illustrating a configuration of a tracking error (TE) detection device employing a DPD method according to a first embodiment of the present invention.

A TE detection device 100 of the first embodiment includes a light-receiving element 101 included in an optical pickup (OPU) of an optical disc, a first AC coupling unit 102, a second AC coupling unit 103, a third AC coupling unit 104, a fourth AC coupling unit 105, a first adder 106, a second adder 107, a first gain control amplifier (GCA) 108, a second GCA 109, a first anti-aliasing filter (AAF) 110, a second AAF 111, a first amplifier 112, a second amplifier 113, a first differentiator 114, a second differentiator 115, a first analog/digital converter (ADC) 116, a second ADC 117, a Hilbert transformer 118, a first delay circuit 119, a second delay circuit 120, a summing circuit 121, a cross-correlator 122, an auto-correlator 123, a gain circuit 124, a normalizer 125, a digital/analog converter (DAC) 126, a low-pass filter (LPF) 127, and a divider 128.

The light-receiving element 101 is divided into four divided light-receiving elements, i.e., a first divided light-receiving element 101-A to a fourth divided light-receiving element 101-D. The first divided light-receiving element 101-A supplies a first RF signal RF1 to the first AC coupling unit 102, a second divided light-receiving element 101-B supplies a fourth RF signal RF4 to the fourth AC coupling unit 105, a third divided light-receiving element 101-C supplies a third RF signal RF3 to the third AC coupling unit 104, a fourth divided light-receiving element 101-D supplies a second RF signal RF2 to the second AC coupling unit 103.

The first AC coupling unit 102 to the fourth AC coupling unit 105 are constituted by capacitors and remove DC components included in the first RF signal RF1 to the fourth RF signal RF4 in which phase differences (time differences) among them change in accordance with tracking error signals output from the light-receiving element 101 included in the optical pickup.

The first adder 106 adds the first RF signal RF1 in which the DC component thereof is removed using the first AC coupling unit 102 and the third RF signal RF3 in which the DC component thereof is removed using the third AC coupling unit 104, and supplies a resultant signal to the first GCA 108.

The second adder 107 adds the second RF signal RF2 in which the DC component thereof is removed using the second AC coupling unit 103 and the fourth RF signal RF4 in which the DC component thereof is removed using the fourth AC coupling unit 105, and supplies a resultant signal to the second GCA 109.

The first GCA 108 controls the signal supplied from the first adder 106 in accordance with variation of an output level of the light-receiving element 101 of the optical pickup (OPU), and supplies a resultant signal to the first AAF 110.

The second GCA 109 controls the signal supplied from the second adder 107 in accordance with variation of an output level of the light-receiving element 101 of the OPU, and supplies a resultant signal to the second AAF 111.

The first AAF 110 restricts an output band of the first GCA 108, prevents aliasing of out-of-band components, and supplies a resultant signal to the first amplifier 112.

The second AAF 111 restricts an output band of the second GCA 109, prevents aliasing of out-of-band components, and supplies a resultant signal to the second amplifier 113.

The first AAF 110 and the second AAF 111 are used to prevent aliasing, and second-order LPFs are employed as the first AAF 110 and the second AAF 111 in this embodiment. Note that an arbitrary order is employed for the LPFs.

When an innermost circumference of an optical disc serving as a recording medium or a seeking start radius is denoted by ri, an outermost circumference or a seeking target radius is denoted by ro, and ro is larger than ri, cutoff frequencies of the first AAF 110 and the second AAF 111 are preferably set so as to be ro/ri times (2.4 times for 12-cm discs) higher than an RF maximum repetition frequency in the radius ri (2T=fcck/4 for Blu-ray, and 3T=fcck/6 for DVD/CD: fcck denotes a channel clock frequency).

The cutoff frequencies are set as described above so that a TE signal is properly detected when the full seeking operation is performed on the disc from the innermost circumference to the outermost circumference.

The first amplifier 112 amplifies the signal output from the first AAF 110 to a predetermined level, and supplies the amplified signal to the first differentiator 114.

The second amplifier 113 amplifies the signal output from the second AAF 111 to a predetermined level, and supplies the amplified signal to the second differentiator 115.

The first amplifier 112 and the second amplifier 113 give over-scale effects to signals to be supplied to the first ADC 116 and the second ADC 117 arranged in a later stage.

Gains of the first amplifier 112 and the second amplifier 113 are determined so that amplitudes of the signals supplied to the first ADC 116 and the second ADC 117 become larger than a full scale.

By this, amplitude variation components are removed using over-scale limit effects of the A/D converters, and the A/D converters having the small number of quantization bits are attained making most of quantization resolution. That is, the quantization resolution is assigned only to the vicinity of a zero-cross point which is important in association with extraction of phase difference information.

Note that the first amplifier 112 and the second amplifier 113 may be coupled to the first GCA 108 and the second GCA 109, respectively.

The first differentiator 114 removes a DC component of a signal output from the first amplifier 112, differentiates the signal, and supplies the signal to the first ADC 116.

The second differentiator 115 removes a DC component of a signal output from the second amplifier 113, differentiates the signal, and supplies the signal to the second ADC 117.

Each of the first differentiator 114 and the second differentiator 115 removes a DC offset generated by a preceding stage, gives a differential characteristic, and improves a demodulation S/N ratio of a phase demodulator in which sensitivity thereof has a differential characteristic and which is arranged in a later stage. The first differentiator 114 and the second differentiator 115 may be constituted by first-order high-pass filters (HPFs)

The first ADC 116 restricts amplitude of a signal output from the first differentiator 114, and samples and quantizes the signal, and thereafter, supplies the signal to the Hilbert transformer 118.

The second ADC 117 restricts amplitude of a signal output from the second differentiator 115, and samples and quantizes the signal, and thereafter, supplies the signal to the first delay circuit 119.

The first ADC 116 and the second ADC 117 are driven using an identical sampling clock CLK. The sampling clock CLK may be asynchronous with the RF. When an innermost circumference of an optical disc serving as a recording medium or a seeking start radius is denoted by ri, an outermost circumference or a seeking target radius is denoted by ro, and ro is larger than ri, a sampling frequency of the first ADC 116 and the second ADC 117 is preferably set so as to be 2×(ro/ri) times (4.8 times for 12-cm discs) higher than the RF maximum repetition frequency in the radius ri (2T=fcck/4 for Blu-ray discs, and 3T=fcck/6 for DVD/CDs: fcck denotes a channel clock frequency).

The sampling frequency is set as described above so that the TE signal is properly detected when the full seeking operation is performed on the disc from the innermost circumference to the outermost circumference.

In this embodiment, the first ADC 116 and the second ADC 117 are replaceable by latched comparators.

The Hilbert transformer 118 shifts a phase of the signal output from the first ADC 116 (or the second ADC 117) by 90 degrees irrespective of a cycle of a signal component and supplies a resultant signal to the cross-correlator 122 serving as a phase comparator.

The first delay circuit 119 delays the signal output from the second ADC 117 (or the first ADC 116) by an amount of delay equal to that caused by the Hilbert transformer 118, and supplies the signal to the cross-correlator 122.

The second delay circuit 120 delays a signal output from the summing circuit 121 by the amount of delay equal to that caused by the Hilbert transformer 118, and supplies the signal to the autocorrelator 123.

The first delay circuit 119 and the second delay circuit 120 may be constituted by bandpass filters (BPFs) having amplitude frequency characteristics the same as that of the Hilbert transformer 118.

Furthermore, a first FIR filter may be arranged instead of the Hilbert transformer 118, and a second FIR filter may be arranged instead of the BPFs serving as the delay circuits, so that a signal output from the first FIR filter and a signal output from the second FIR filter has a phase difference of 90 degrees irrespective of a signal cycle.

In particular, the first FIR filter and the second FIR filter may be configured such that an amount of a phase shift of the first FIR filter is +45 degrees (or −45 degrees) irrespective of the signal cycle and an amount of a phase shift of the second FIR filter is −45 degrees (or +45 degrees) irrespective of the signal cycle.

Examples of impulse responses and TAP coefficients in this case are shown in FIGS. 2 to 5.

Figures 2, 3:
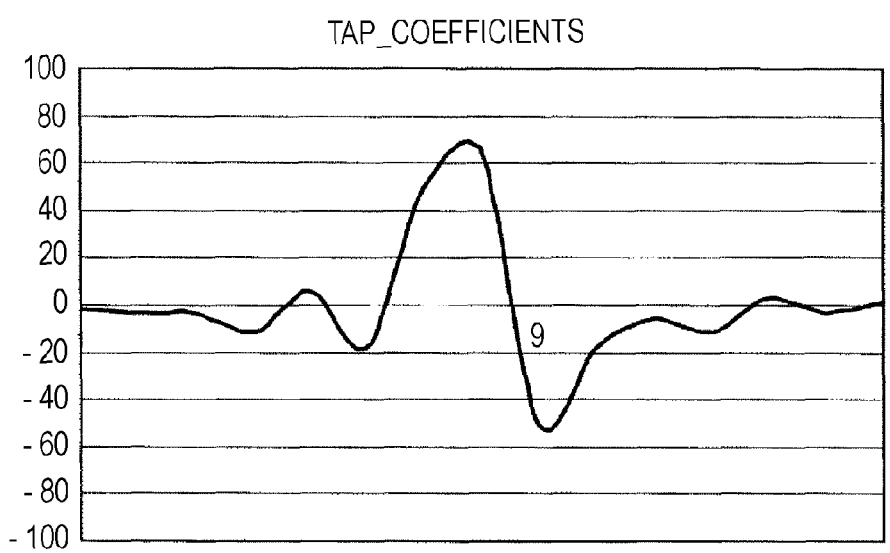
FIG. 2 is a diagram illustrating TAP coefficients (=impulse responses) of a FIR (finite impulse response) filter having phase shift of +45 degrees irrespective of a signal cycle.
FIG. 3 is a diagram illustrating the relationships between TAP numbers and the TAP coefficients of the FIR filter having phase shift of +45 degrees irrespective of a signal cycle.

FIG. 2 is a diagram illustrating TAP coefficients (=impulse responses) of a FIR filter having phase shift of +45 degrees irrespective of a signal cycle.

FIG. 3 is a diagram illustrating the relationships between TAP numbers and the TAP coefficients of the FIR filter having phase shift of +45 degrees irrespective of a signal cycle.

Figures 4, 5:
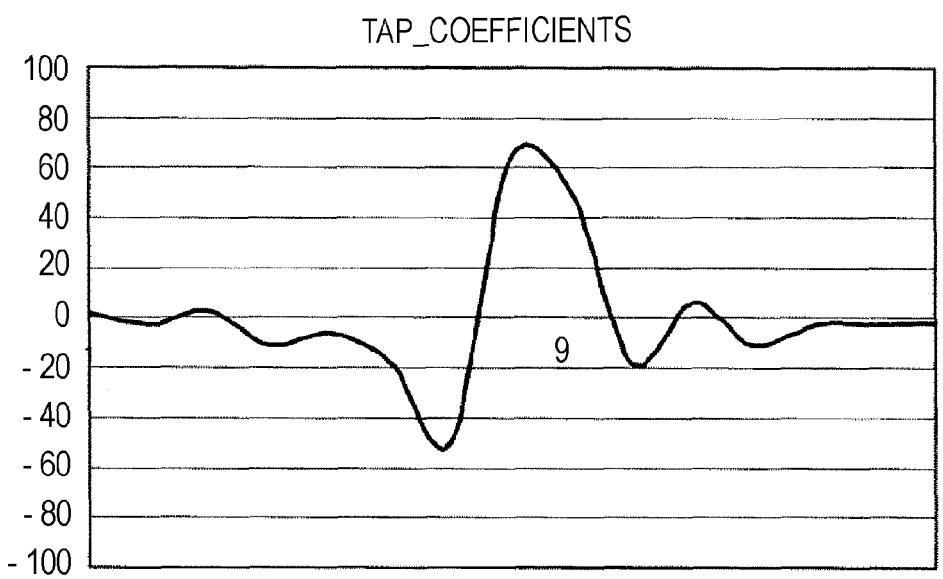
FIG. 4 is a diagram illustrating TAP coefficients (=impulse responses) of a FIR (finite impulse response) filter having phase shift of −45 degrees irrespective of a signal cycle.
FIG. 5 is a diagram illustrating the relationships between TAP numbers and the TAP coefficients of the FIR filter having phase shift of −45 degrees irrespective of a signal cycle.

FIG. 4 is a diagram illustrating TAP coefficients (=impulse responses) of a FIR filter having phase shift of −45 degrees irrespective of a signal cycle.

FIG. 5 is a diagram illustrating the relationships between TAP numbers and the TAP coefficients of the FIR filter having phase shift of −45 degrees irrespective of a signal cycle.

The summing circuit 121 calculates a total sum of the signal output from the first ADC 116 and the signal output from the second ADC 117. The signal output from the summing circuit 121 is supplied through the second delay circuit 120 to the autocorrelator 123.

The cross-correlator 122 calculates a correlation coefficient CC representing a phase difference between input RF signals using the signal output from the Hilbert transformer 118 and the signal output from the first delay circuit 119, and outputs a resultant signal to the normalizer 125.

Figure 6:
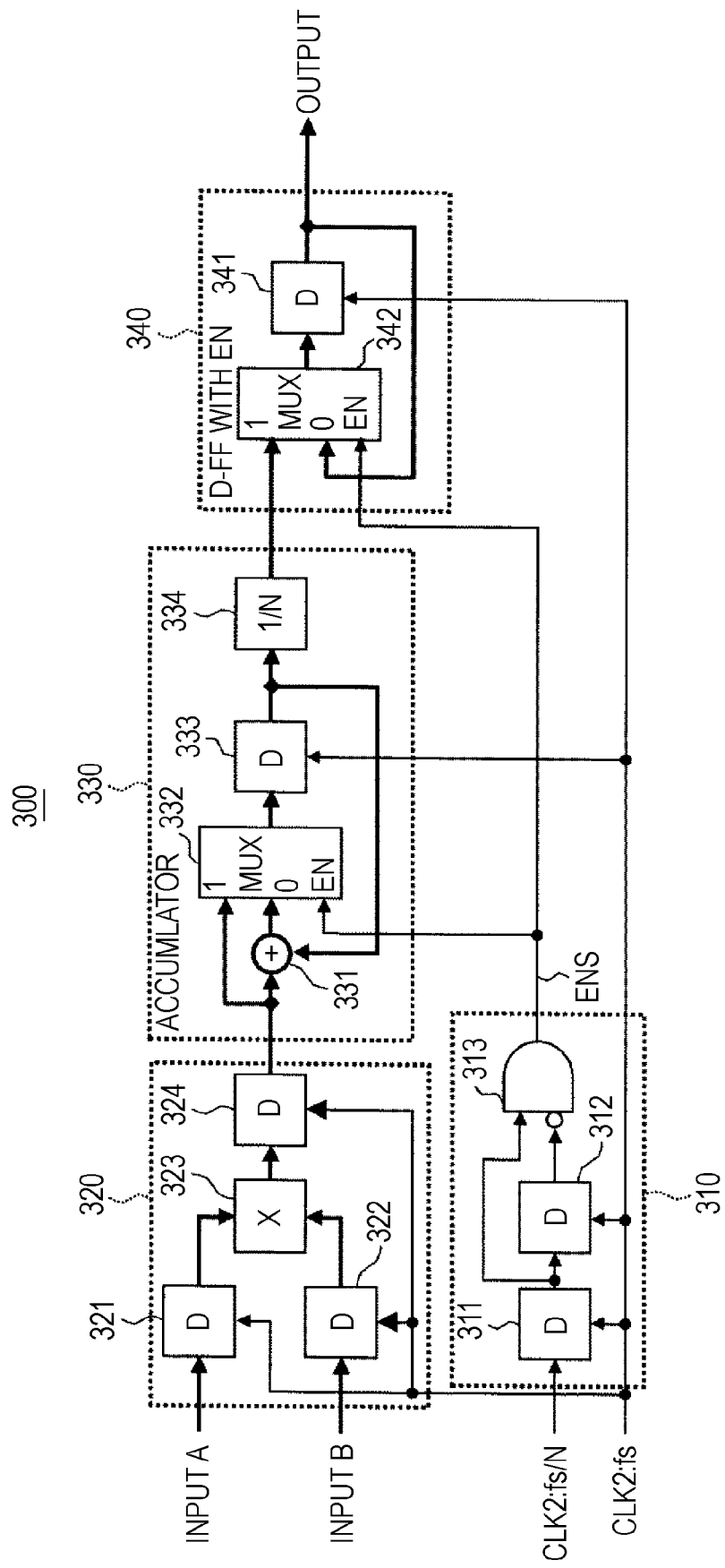
FIG. 6 is a circuit diagram illustrating a configuration example of a correlator according to the first embodiment.

FIG. 6 is a circuit diagram illustrating a configuration example of a correlator according to the first embodiment.

A correlator 300 includes an enable signal generator 310, a digital multiplier 320, an accumulator 330, and an output unit 340.

In FIG. 6, a frequency division clock CLK2 is obtained by dividing the clock CLK having a frequency of fs by N using the divider 128. That is, the frequency division clock CLK2 has a frequency of fs/N.

The enable signal generator 310 includes a first latching unit 311 which latches the frequency division clock CLK2 in synchronization with the clock CLK, a second latching unit 312 which latches a signal output from the first latching unit 311 in synchronization with the clock CLK, and a gate circuit 313 which generates an enable signal (pulse) ENS by a logical operation using a signal supplied from the first latching unit 311 as a positive input and a signal supplied from the second latching unit 312 as a negative input.

The digital multiplier 320 includes a third latching unit 321 which latches an input signal A (for example, a signal output from a Hilbert converter) in synchronization with the clock CLK, a fourth latching unit 322 which latches an input signal B (for example, a signal output from a delay circuit) in synchronization with the clock CLK, a multiplier 323 which multiplies the input signal A and the input signal B which have been latched using the third latching unit 321 and the fourth latching unit 322, respectively, and a fifth latching unit 324 which latches a signal output from the multiplier 323 in synchronization with the clock CLK and supplies a resultant signal to the accumulator 330.

The accumulator 330 includes an adder 331, a first multiplexer 332 which selects one of a signal output from the digital multiplier 320 and a signal output from the adder 331 in accordance with the enable signal ENS, and outputs the selected signal, a sixth latching unit 333 which latches the signal output from the first multiplexer 332 in synchronization with the clock CLK, and a normalizer (divider) 334 which divides a signal output from the sixth latching unit 333 by N and outputs a resultant signal to the output unit 340.

The adder 331 adds the signal output from the digital multiplier 320 and the signal output from the sixth latching unit 333.

The output unit 340 includes a seventh latching unit 341 and a second multiplexer 342 which selects one of the signal output from the accumulator 330 and a signal output from the seventh latching unit 341 in accordance with the enable signal ENS and outputs the selected signal to the seventh latching unit 341.

The seventh latching unit 341 latches the signal output from the second multiplexer 342 in synchronization with the clock CLK and outputs a signal serving as a signal of a correlator.

The autocorrelator 123 calculates an autocorrelation coefficient AC0 of the signal output from the summing circuit 121.

The autocorrelator 123 may be constituted by a multiplier and an integrator which accumulates and adds signals output from the multiplier, and holds and normalizes (divides) a result of the accumulation and addition using a fixity coefficient, for example.

The multiplier is replaceable by a balanced modulator or an exclusive-OR circuit.

The gain circuit 124 amplifies a signal output from the autocorrelator 123 using a predetermined gain, and supplies the amplified signal to the normalizer 125.

The gain circuit 124 multiplies the autocorrelation coefficient AC0 by an appropriate fixity coefficient (in this embodiment, 2 for BDs (Blu-ray discs) and CDs (compact discs), and 4 for DVDs (digital versatile discs)) selected in accordance with a type of medium (disc) to thereby generate an envelope signal ENV which is a square value of the total sum.

The normalizer 125 normalizes (divides) the signal output from the cross-correlator 122 using the envelope signal ENV obtained through the autocorrelator 123 and the gain circuit 124. Instead of the envelope signal ENV which is a square value of the total sum, an absolute value signal may be used for normalization.

The normalizer 125 is basically constituted by an LUT (look up table) and multipliers. The normalizer 125 preferably includes a lower limiter for a level of the envelope signal ENV so as to prevent zero division and divergence from occurring due to a signal defect.

Figure 7:
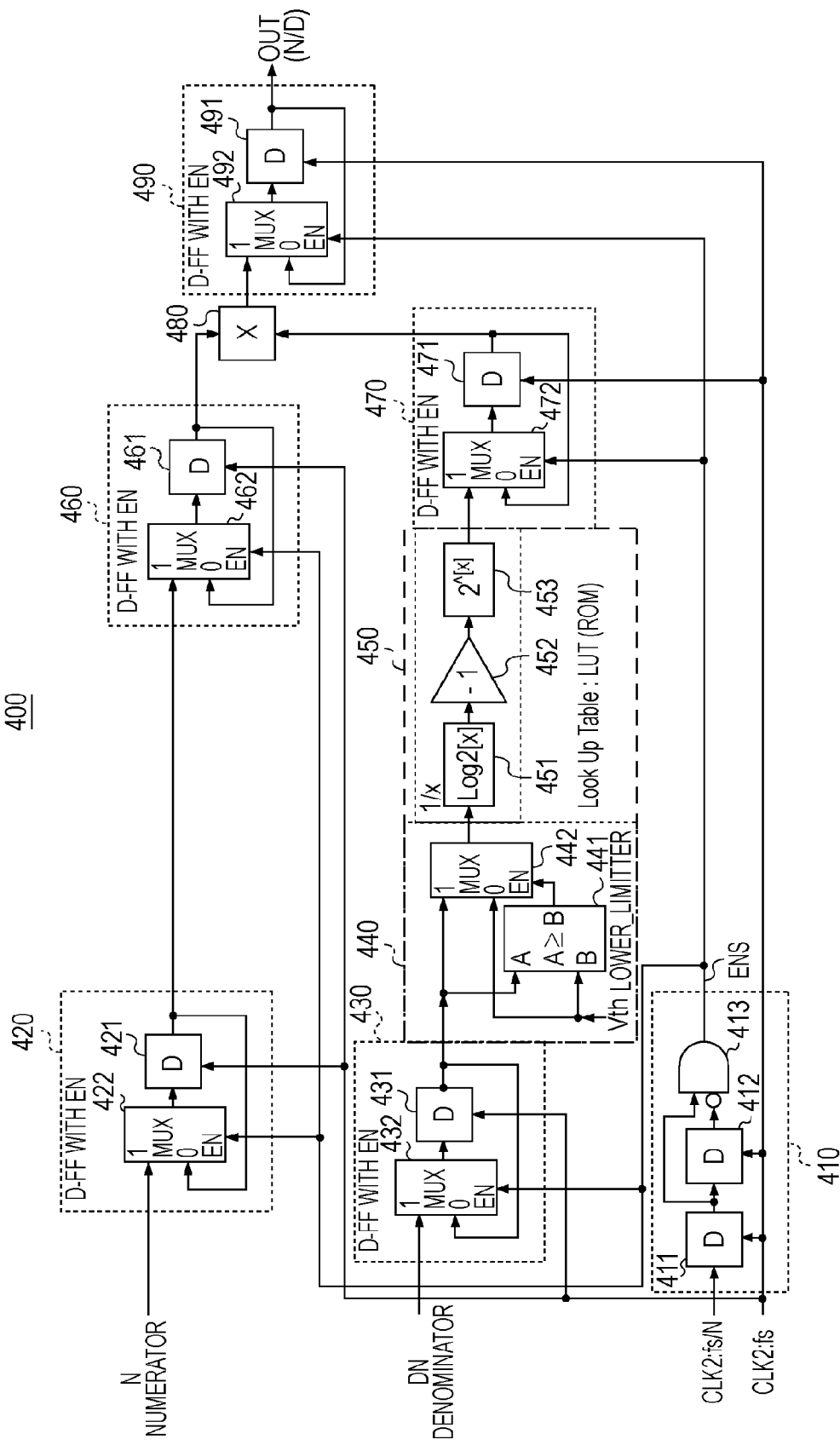
FIG. 7 is a circuit diagram illustrating a configuration example of a normalizer according to the first embodiment.

FIG. 7 is a circuit diagram illustrating a configuration example of a normalizer according to the first embodiment.

A normalizer 400 shown in FIG. 7 includes an enable signal generator 410, a numerator data input unit 420, a denominator data input unit 430, a lower limiter 440, a look up table (LUT) 450, a first timing controller 460, a second timing controller 470, a multiplier 480, and an output unit 490.

Note that, in FIG. 7, as with the correlator, the frequency division clock CLK2 is obtained by dividing the clock CLK having a frequency of fs by N using the divider 128.

The enable signal generator 410 includes a first latching unit 411 which latches the frequency division clock CLK2 in synchronization with the clock CLK, a second latching unit 412 which latches a signal output from the first latching unit 411 in synchronization with the clock CLK, and a gate circuit 413 which generates an enable signal (pulse) ENS by a logical operation using the signal output from the first latching unit 411 as a positive input and a signal output from the second latching unit 412 as a negative input.

The numerator data input unit 420 includes a third latching unit 421 and a first multiplexer 422 which selects one of numerator data N and a signal output from the third latching unit 421 in accordance with the enable signal ENS and which supplies the selected one of the numerator data N and the signal output from the third latching unit 421 to the third latching unit 421.

The third latching unit 421 latches a signal output from the first multiplexer 422 in synchronization with the clock CLK and supplies the signal to the first timing controller 460.

The denominator data input unit 430 includes a fourth latching unit 431 and a second multiplexer 432 which selects one of denominator data DN and a signal output from the fourth latching unit 431 in accordance with the enable signal ENS and which supplies the selected one of the denominator data DN and the signal output from the fourth latching unit 431 to the fourth latching unit 431.

The fourth latching unit 431 latches the signal output from the second multiplexer 432 in synchronization with the clock CLK and supplies the signal to the lower limiter 440.

The lower limiter 440 includes a comparison controller 441 which makes the enable signal ENS active when a voltage of a signal output from the denominator data input unit 430 as an input A is larger than that of an input B (a threshold value Vth), and a third multiplexer 442 which selects the signal output from the denominator data input unit 430 when the enable signal ENS is in an active state and which supplies the signal to the LUT 450.

The LUT 450 is a ROM lookup table including a log calculator 451 used to calculate an inverse number, an inverter 452, and an exponentiator 453.

The first timing controller 460 includes a fifth latching unit 461 and a fourth multiplexer 462 which selects one of the signal output from the numerator data input unit 420 and a signal output from the fifth latching unit 461 in accordance with the enable signal ENS and supplies the selected signal to the fifth latching unit 461.

The fifth latching unit 461 supplies the signal output from the fourth multiplexer 462 to the multiplier 480 in synchronization with the clock CLK.

The second timing controller 470 includes a sixth latching unit 471, and a fifth multiplexer 472 which selects one of a signal output from the LUT 450 and a signal output from the sixth latching unit 471 and supplies the selected signal to the sixth latching unit 471.

The sixth latching unit 471 supplies the signal output from the fifth multiplexer 472 to the multiplier 480 in synchronization with the clock CLK.

The multiplier 480 multiplies the numerator data supplied through the first timing controller 460 by inversion of the denominator data supplied through the second timing controller 470 and supplies a resultant signal to the output unit 490.

The output unit 490 includes a seventh latching unit 491 and a sixth multiplexer 492 which selects one of the signal output from the multiplier 480 and a signal output from the seventh latching unit 491 in accordance with the enable signal ENS and which supplies the selected signal to the seventh latching unit 491.

The seventh latching unit 491 latches the signal output from the sixth multiplexer 492 in synchronization with the clock CLK and outputs the signal as an output signal of the normalizer 400.

As described above, the normalizer is constituted by the LUT (look up table) which calculates inversion and the multipliers. In the normalizer, a denominator should include a lower limiter as shown in FIG. 7 so as to prevent zero division and divergence from occurring due to a signal defect. The lower limiter may be reflected to the LUT.

```
module lowlim(in, vth, out);
    input (N:0) in;
    input (N:0) vth;
    output (N:0) out;
    if (in < vth)
        assign out=vth;
    else
        assign out=in;
endmodule
```

A lower limit value (the threshold value Vth in FIG. 7) corresponds to a level eight times less than a normal level of the envelope signal ENV, for example.

The DAC 126 converts a digital signal output from the normalizer 125 into an analog signal.

The LPF 127 smoothes the signal output from the DAC 126 so as to obtain a TE signal to be output.

Next, operation of the TE detection device 100 having the configuration described above will be described.

The light-receiving element 101 is divided into the four light-receiving elements, i.e., the first divided light-receiving element 101-A to the fourth divided light-receiving element 101-D as described above. The first divided light-receiving element 101-A supplies the first RF signal RF1 to the first AC coupling unit 102. Similarly, the second divided light-receiving element 101-B supplies the fourth RF signal RF4 to the fourth AC coupling unit 105, the third divided light-receiving element 101-C supplies the third RF signal RF3 to the third AC coupling unit 104, and the fourth divided light-receiving element 101-D supplies the second RF signal RF2 to the second AC coupling unit 103.

The first AC coupling unit 102 to the fourth AC coupling unit 105 remove DC components included in the first RF signal RF1 to the fourth RF signal RF4 in which phase differences (time differences) among them change in accordance with a tracking error signal output from the light-receiving element 101 included in the optical pickup.

The first adder 106 adds the first RF signal RF1 in which the DC component thereof is removed using the first AC coupling unit 102 and the third RF signal RF3 in which the DC component thereof is removed using the third AC coupling unit 104, and supplies a resultant signal to the first GCA 108.

The second adder 107 adds the second RF signal RF2 in which the DC component thereof is removed using the second AC coupling unit 103 and the fourth RF signal RF4 in which the DC component thereof is removed using the fourth AC coupling unit 105, and supplies a resultant signal to the second GCA 109.

The first GCA 108 controls the signal supplied from the first adder 106 in accordance with variation of an output level of the light-receiving element 101 of the optical pickup (OPU), and supplies a resultant signal to the first AAF 110. Similarly, the second GCA 109 controls the signal supplied from the second adder 107 in accordance with variation of an output level of the light-receiving element 101 of the OPU, and supplies a resultant signal to the second AAF 111.

The first AAF 110 restricts an output band of the first GCA 108, prevents aliasing of out-of-band components, and supplies a resultant signal to the first amplifier 112 where the signal is amplified and supplied to the first differentiator 114. The second AAF 111 restricts an output band of the second GCA 109, prevents aliasing of out-of-band components, and supplies a resultant signal to the second amplifier 113 where the signal is amplified so as to be supplied to the second differentiator 115.

The first differentiator 114 removes a DC component of a signal output from the first amplifier 112, differentiates the signal, and supplies the signal to the first ADC 116. The second differentiator 115 removes a DC component of a signal output from the second amplifier 113, differentiates the signal, and supplies the signal to the second ADC 117.

The first ADC 116 restricts amplitude of a signal output from the first differentiator 114, and samples and quantizes the signal, and thereafter, supplies the signal to the Hilbert transformer 118 as a digital signal.

Similarly, the second ADC 117 restricts amplitude of a signal output from the second differentiator 115, and samples and quantizes the signal, and thereafter, supplies the signal to the first delay circuit 119 as a digital signal.

The Hilbert transformer 118 shifts a phase of the signal output from the first ADC 116 by 90 degrees irrespective of a cycle of a signal component and supplies a resultant signal to the cross-correlator 122.

The first delay circuit 119 delays the signal output from the second ADC 117 by an amount of delay equal to that caused by Hilbert transformer 118, and supplies the signal to the cross-correlator 122.

Simultaneously, the summing circuit 121 calculates a total sum of the signal output from the first ADC 116 and the signal output from the second ADC 117. The signal output from the summing circuit 121 is supplied to the second delay circuit 120 which delays the signal by the amount of delay equal to that caused by the Hilbert transformer 118. Thereafter, the signal is further supplied to the autocorrelator 123.

The cross-correlator 122 calculates a correlation coefficient CC representing a phase difference between input RF signals using the signal output from the Hilbert transformer 118 and the signal output from the first delay circuit 119, and outputs a resultant signal to the normalizer 125.

The autocorrelator 123 calculates an autocorrelation coefficient AC0 of the signal output from the summing circuit 121 and the autocorrelation coefficient AC0 is supplied to the gain circuit 124.

The gain circuit 124 multiplies the autocorrelation coefficient AC0 by an appropriate fixity coefficient selected in accordance with a type of medium (disc) to thereby generate an envelope signal ENV which is a square value of the total sum, and the envelope signal ENV is supplied to the normalizer 125.

The normalizer 125 normalizes (divides) the signal output from the cross-correlator 122 using the envelope signal ENV obtained through the autocorrelator 123 and the gain circuit 124.

Then, the DAC 126 converts a digital signal supplied from the normalizer 125 into an analog signal, and thereafter, the LPF 127 smoothes the signal so as to obtain a TE signal to be output.

That is, the digital signal output from the normalizer 125 is converted into an analog signal using the DAC 126, and is smoothed using the LPF 127 (post filter). Thereafter, an image component in the signal is removed and the signal is supplied as a DPD tracking error signal TEout to a tracking servo control device (not shown).

According to the first embodiment, the TE detection device employing the DPD method is realized as a digital circuit which operates at high speed with high accuracy. Advantages of the TE detection device will be described in detail hereinafter.

Second Embodiment

Figure 8:
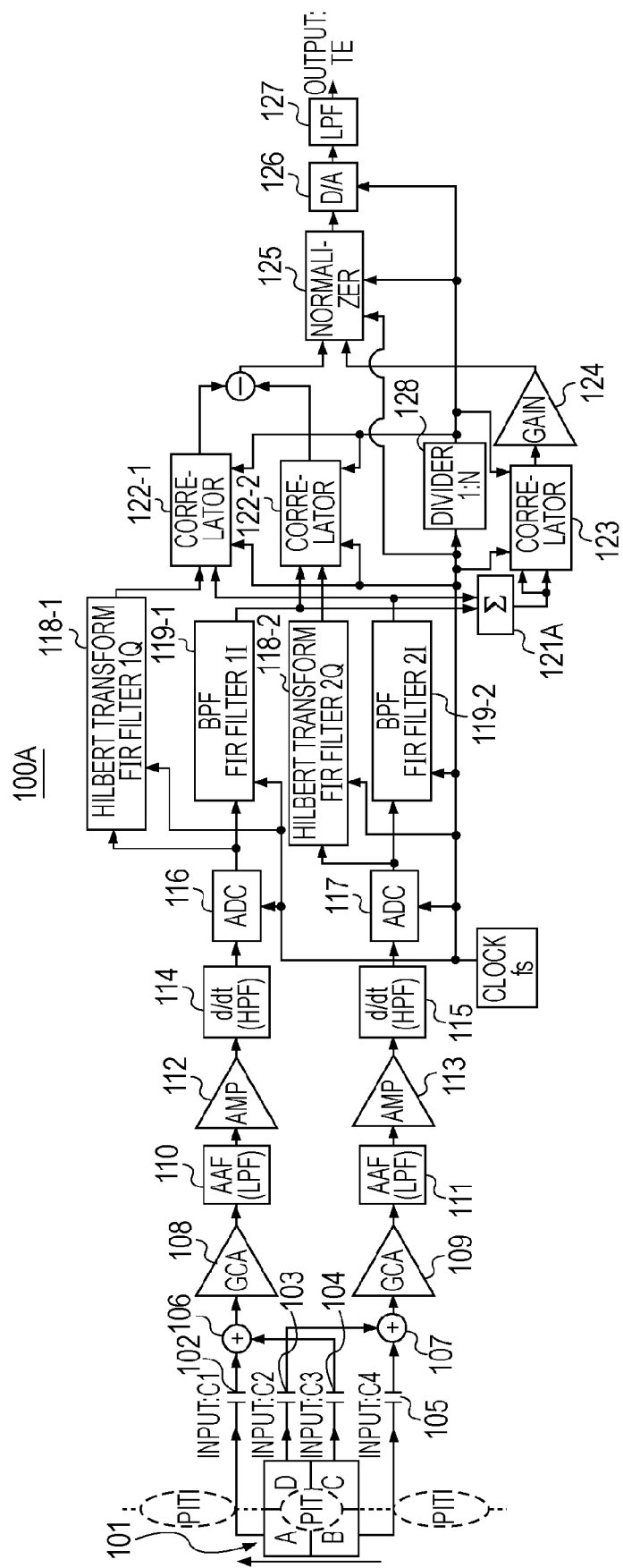
FIG. 8 is a circuit diagram illustrating a configuration example of a tracking error (TE) detection device employing a DPD method according to a second embodiment of the present invention.

FIG. 8 is a circuit diagram illustrating a configuration example of a tracking error (TE) detection device employing a DPD method according to a second embodiment of the present invention.

A TE detection device 100A according to the second embodiment is different from the TE detection device 100 according to the first embodiment in the following points.

A first ADC 116 is connected at an output terminal thereof to a first Hilbert transformer 118-1 and a first delay circuit 119-1, and a second ADC 117 is connected at an output terminal thereof to a second Hilbert transformer 118-2 and a second delay circuit 119-2.

Furthermore, the first Hilbert transformer 118-1 and the second delay circuit 119-2 are connected to a first cross-correlator 122-1 which calculates the correlation between a signal output from the first Hilbert transformer 118-1 and a signal output from the second delay circuit 119-2. Moreover, the second Hilbert transformer 118-2 and the first delay circuit 119-1 are connected to a second cross-correlator 122-2 which calculates the correlation between a signal output from the second Hilbert transformer 118-2 and a signal output from a first delay circuit 119-1.

The first cross-correlator 122-1 and the second cross-correlator 122-2 are connected to a subtractor 129 which performs a subtraction operation so as to obtain a difference value between a signal output from the first cross-correlator 122-1 and a signal output from the second cross-correlator 122-2. A signal output from the subtractor 129 is supplied to a normalizer 125 as numerator data.

A summing circuit 121A calculates a total sum of the signal output from the first delay circuit 119-1 and the signal output from the second delay circuit 119-2.

Figure 9:
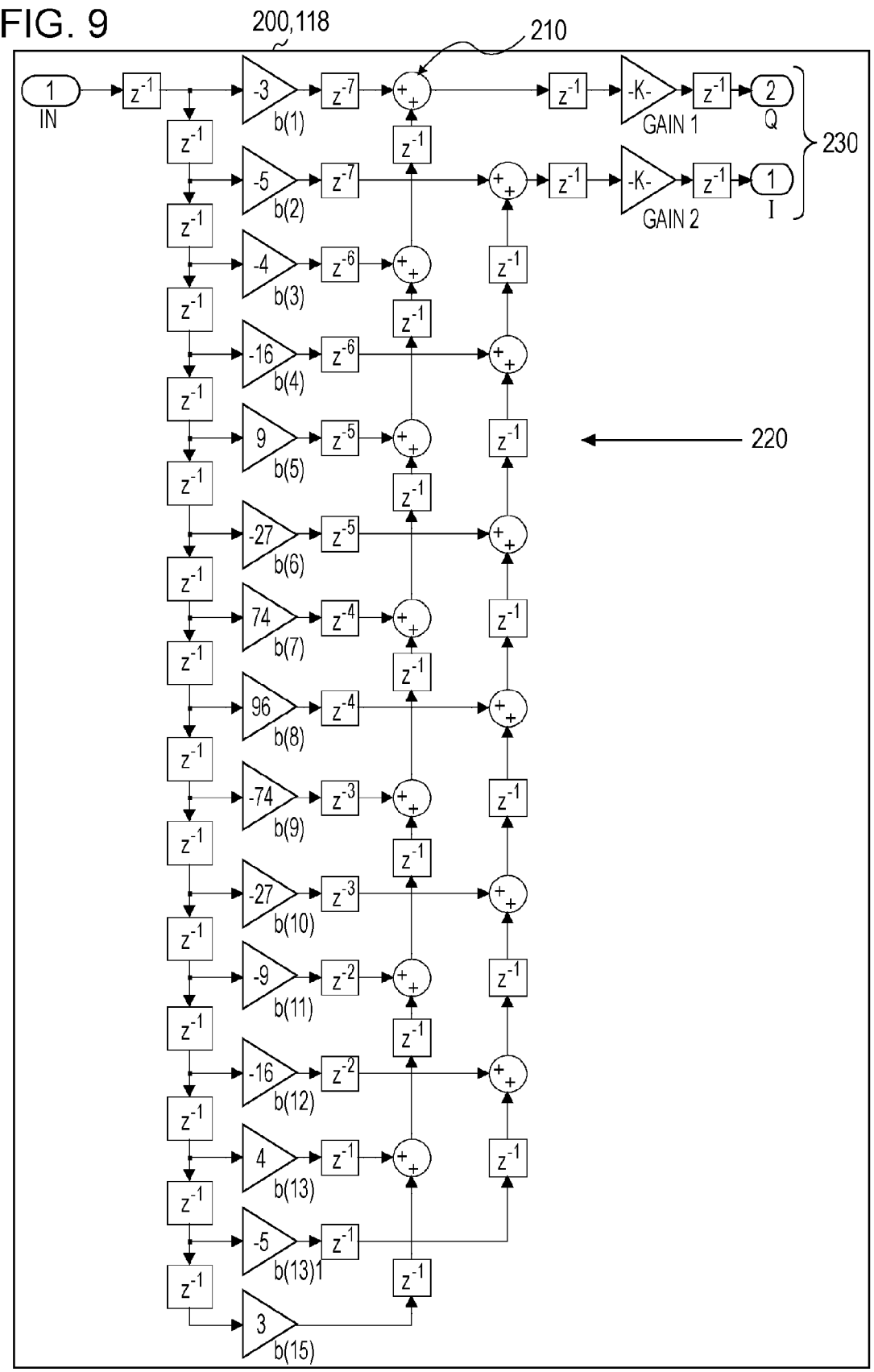
FIG. 9 is a circuit diagram illustrating a configuration example of a Hilbert IQ filter according to the second embodiment.

In this case, each of a pair of the first Hilbert transformer 118-1 and the first delay circuit 119-1 and a pair of the second Hilbert transformer 118-2 and the second delay circuit 119-2 may be constituted by a single FIR filter which has two independent TAP leading lines which are interleaved in a comb-like shape as shown in FIG. 9 and output terminals (I and Q). Accordingly, the size of the circuit is reduced.

FIG. 9 is a circuit diagram illustrating a configuration example of a Hilbert IQ filter 200 according to the second embodiment.

Figures 10, 11:
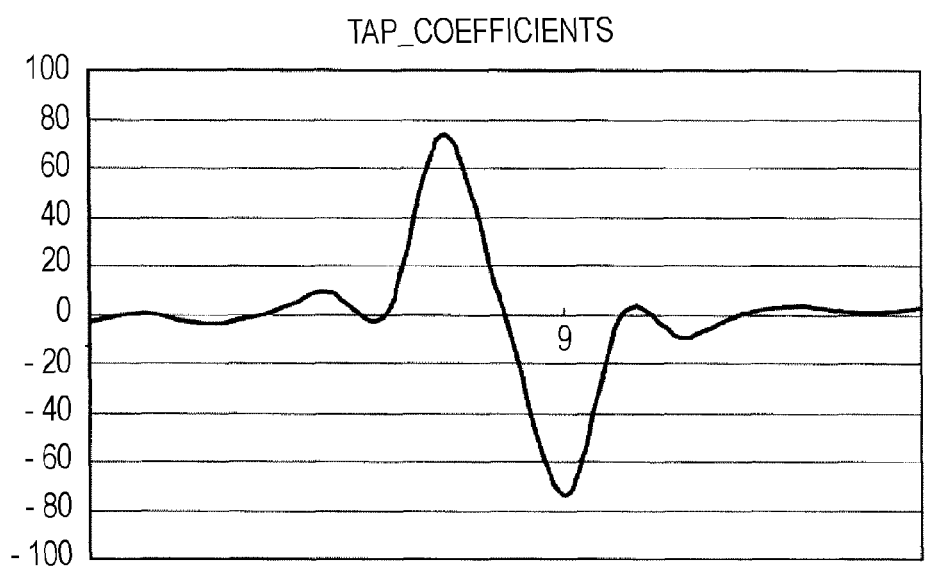
FIG. 10 is a diagram illustrating TAP coefficients (=impulse responses) of a Hilbert transformer according to the second embodiment.
FIG. 11 is a diagram illustrating the relationship between TAP numbers and the TAP coefficients of the Hilbert transformer according to the second embodiment.

FIG. 10 is a diagram illustrating TAP coefficients (=impulse responses) of a Hilbert transformer according to the second embodiment.

FIG. 11 is a diagram illustrating the relationship between TAP numbers and TAP coefficients of the Hilbert transformer according to the second embodiment.

Figures 12, 13:
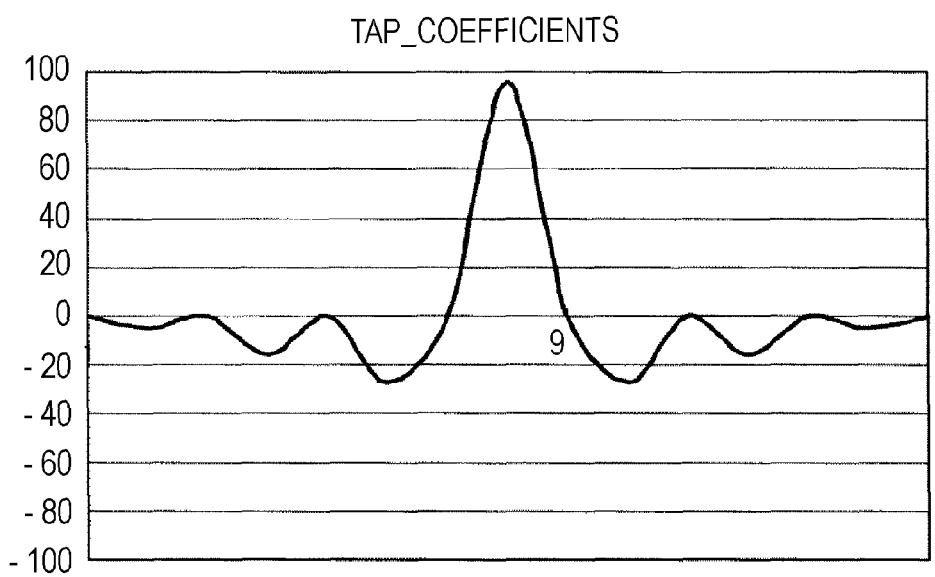
FIG. 12 is a diagram illustrating TAP coefficients (=impulse responses) of a bandpass filter according to the second embodiment.
FIG. 13 is a diagram illustrating the relationships between TAP numbers and the TAP coefficients of the bandpass filter according to the second embodiment.

FIG. 12 is a diagram illustrating TAP coefficients (=impulse responses) of a bandpass filter according to the second embodiment FIG. 13 is a diagram illustrating the relationships between TAP numbers and TAP coefficients of the bandpass filter according to the second embodiment.

As shown in FIG. 9, a signal output from the output terminal Q of the Hilbert IQ filter 200 has a Hilbert transform characteristic. A frequency transfer function of the Hilbert transform characteristic is represented by the following expression.

$$H(\omega)=e-\Pi/2(\omega>0)/H(\omega)=0\ (\omega=0,2\Pi fs/2)/H(\omega)=-e-\Pi/2(\omega<0)$$ Expression 1

That is, a 90-degree ($\pi/2$) phase shift is performed irrespective of a signal cycle. An amplitude characteristic is controlled so that a bandpass characteristic in which a DC frequency and a Nyquist frequency have null values is obtained.

As shown in FIGS. 10 and 11, TAP coefficients of the Hilbert transformers have coefficient profiles of point symmetry in which opposite signed values with respect to a center TAP as the center point are shown. Therefore, it is not physically possible to implement the Hilbert transformers of this embodiment in an analog circuit in terms of causality.

As shown in FIG. 9, a signal output from the output terminal I is controlled to have a bandpass characteristic corresponding to an amplitude characteristic the same as that of the signal output from the output terminal Q. An amount of delay of the signal output from the output terminal I is controlled to be the same as that of the signal output from the output terminal Q.

As shown in FIGS. 12 and 13, TAP coefficients of the bandpass filters have coefficient profiles of line symmetry with a center TAP as the center. Therefore, it is not physically possible to implement the BPFs of this embodiment in an analog circuit in terms of causality.

The amplitude characteristic of this embodiment is controlled so that a bandpass characteristic in which a DC frequency and a Nyquist frequency have null values is obtained. Furthermore, the amplitude characteristic is set so as to be line asymmetry with a half-Nyquist frequency (fs/4) as the center. By this, as shown in FIGS. 9 to 11, values 0 are alternately shown in the TAP coefficients. Accordingly, the TAP coefficients of the Hilbert transformers and the TAP coefficients of the BPFs are arranged complementary to each other.

Consequently, each of the pair of the first Hilbert transformer 118-1 and the first delay circuit 119-1, and the pair of the second Hilbert transformer 118-2 and the second delay circuit 119-2 may be constituted by a single FIR filter which has two independent TAP leading lines 210 and 220 which are interleaved in a comb-like shape as shown in FIG. 9 and output terminals (I and Q) 230. Accordingly, the size of the circuit is reduced.

With this configuration, the TE detection device employing a DPD method is realized as a digital circuit which performs at high speed with high accuracy.

Third Embodiment

Figure 14:
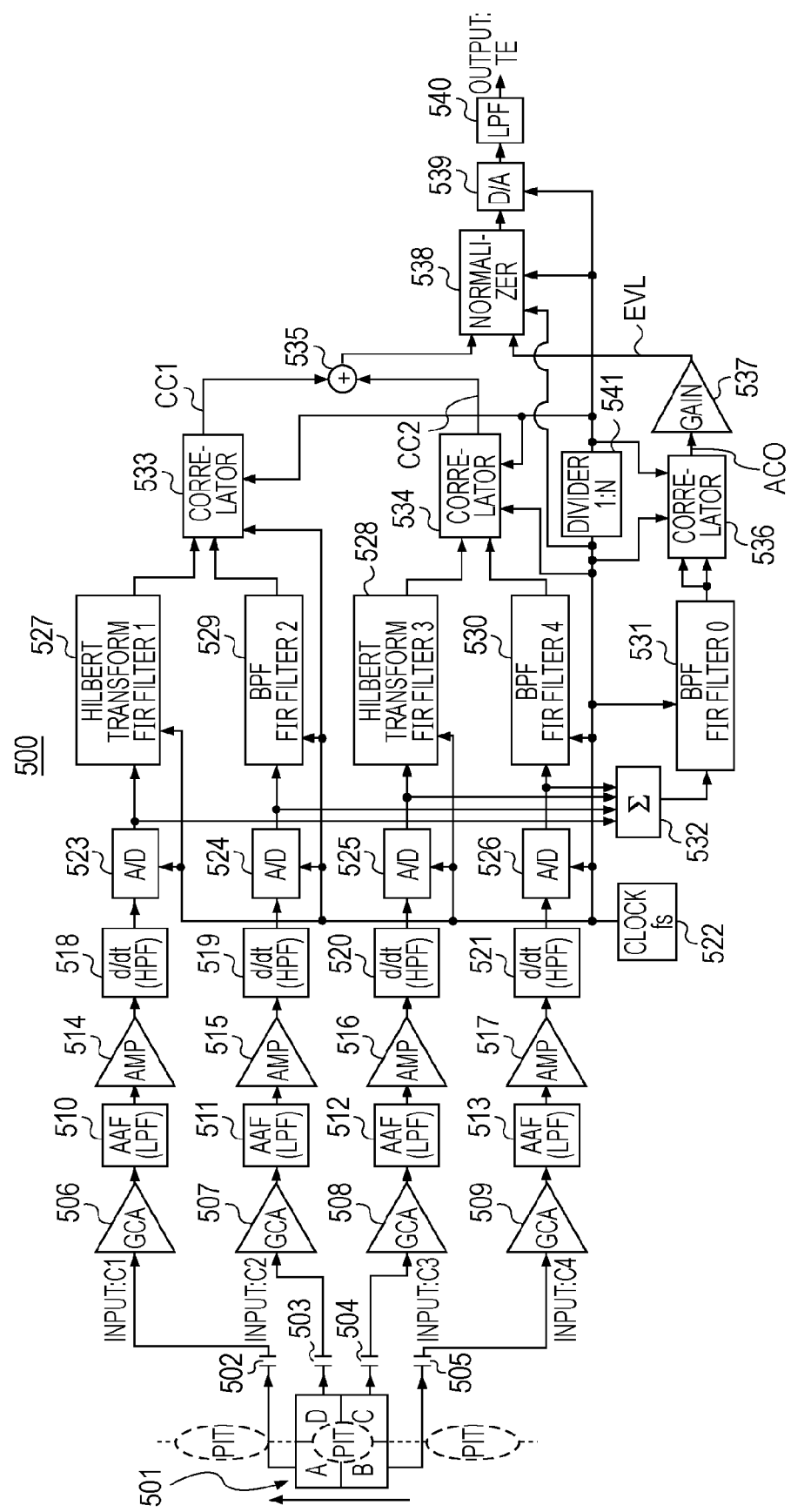
FIG. 14 is a circuit diagram illustrating a configuration example of a tracking error (TE) detection device employing a DPD method according to a third embodiment of the present invention.

FIG. 14 is a circuit diagram illustrating a configuration example of a tracking error (TE) detection device employing a DPD method according to a third embodiment of the present invention.

A TE detection device 500 according to the third embodiment includes a light-receiving element 501 arranged in an optical pickup (OPU) in an optical disc, a first AC coupling unit 502 to a fourth AC coupling unit 505, a first GCA 506 to a fourth GCA 509, a first AAF 510 to a fourth AAF 513, a first amplifier 514 to a fourth amplifier 517, a first differentiator 518 to a fourth differentiator 521, a clock generator 522, a first ADC 523 to a fourth ADC 526, a first Hilbert transformer 527, a second Hilbert transformer 528, a first delay circuit 529 to a third delay circuit 531, a summing circuit 532, a first cross-correlator 533, a second cross-correlator 534, an adder 535, an autocorrelator 536, a gain circuit 537, a normalizer 538, a DAC 539, an LPF 540, and a divider 541.

The light-receiving element 501 is divided into four divided light-receiving elements, i.e., a first divided light-receiving element 501-1 to a fourth divided light-receiving element 501-D. The first divided light-receiving element 501-A supplies a first RF signal RF1 to the first AC coupling unit 502, the second divided light-receiving element 501-B supplies a fourth RF signal RF4 to the fourth AC coupling unit 505, the third divided light-receiving element 501-C supplies a third RF signal RF3 to the third AC coupling unit 504, the fourth divided light-receiving element 501-D supplies a second RF signal RF2 to the second AC coupling unit 503.

The first AC coupling unit 502 to the fourth AC coupling unit 505 are each constituted by capacitors and remove DC components included in the first RF signal RF1 to the fourth RF signal RF4 in which phase differences (time differences) among them change in accordance with tracking error signals output from the light-receiving element 501 included in the optical pickup.

The first GCA 506 controls a signal supplied from the first AC coupling unit 502 in accordance with variation of an output level of the light-receiving element 501 of the optical pickup (OPU), and supplies a resultant signal to the first AAF 510.

The second GCA 507 controls a signal supplied from the second AC coupling unit 503 in accordance with the variation of the output level of the light-receiving element 501 of the OPU, and supplies a resultant signal to the second AAF 511.

The third GCA 508 controls a signal supplied from the third AC coupling unit 504 in accordance with the variation of the output level of the light-receiving element 501 of the OPU, and supplies a resultant signal to the third AAF 512.

The fourth GCA 509 controls a signal supplied from the fourth AC coupling unit 505 in accordance with the variation of the output level of the light-receiving element 501 of the OPU, and supplies a resultant signal to the fourth AAF 513.

The first AAF 510 restricts an output band of the first GCA 506, prevents aliasing of out-of-band components, and supplies a resultant signal to the first amplifier 514.

The second AAF 511 restricts an output band of the second GCA 507, prevents aliasing of out-of-band components, and supplies a resultant signal to the second amplifier 515.

The third AAF 512 restricts an output band of the third GCA 508, prevents aliasing of out-of-band components, and supplies a resultant signal to the third amplifier 516.

The fourth AAF 513 restricts an output band of the fourth GCA 509, prevents aliasing of out-of-band components, and supplies a resultant signal to the fourth amplifier 517.

As with the first and second embodiments, the first AAF 510 to the fourth AAF 513 are used to prevent aliasing, and second-order LPFs are employed as the first AAF 510 to the fourth AAF 513 in this embodiment. Note that an arbitrary order is employed for the LPFs.

When an innermost circumference of an optical disc serving as a recording medium or a seeking start radius is denoted by ri, an outermost circumference or a seeking target radius is denoted by ro, and ro is larger than ri, cutoff frequencies of the first AAF 510 to the fourth AAF 513 are preferably set so as to be ro/ri times (2.4 times for 12-cm discs) higher than an RF maximum repetition frequency in the radius ri (2T=fcck/4 for Blu-ray discs, and 3T=fcck/6 for DVDs and CDs: fcck denotes a channel clock frequency).

The cutoff frequencies are set as described above so that a TE signal is properly detected when the full seeking operation is performed on the disc from the innermost circumference to the outermost circumference.

The first amplifier 514 amplifies a signal output from the first AAF 510 to a predetermined level and supplies the signal to the first differentiator 518.

The second amplifier 515 amplifies a signal output from the second AAF 511 to a predetermined level and supplies the signal to the second differentiator 519.

The third amplifier 516 amplifies a signal output from the third AAF 512 to a predetermined level and supplies the signal to the third differentiator 520.

The fourth amplifier 517 amplifies a signal output from the fourth AAF 513 to a predetermined level and supplies the signal to the fourth differentiator 521.

The first amplifier 514 to the fourth amplifier 517 give over-scale effects to signals to be supplied to the first ADC 523 to the fourth ADC 526 arranged in a later stage.

Gains of the first amplifier 514 to the fourth amplifier 517 are determined so that amplitudes of the signals supplied to the first ADC 523 to the fourth ADC 526 become larger than a full scale.

By this, amplitude variation components are removed using over-scale limit effects of the A/D converters, and the A/D converters having the small number of quantization bits are attained making most of quantization resolution. That is, the quantization resolution is assigned only to the vicinity of a zero-cross point which is important in association with extraction of phase difference information.

Note that the first amplifier 514 to the fourth amplifier 517 may be coupled to the first GCA 506 to the fourth GCA 509, respectively.

The first differentiator 518 removes a DC component of a signal output from the first amplifier 514, differentiates the signal, and supplies the signal to the first ADC 523.

The second differentiator 519 removes a DC component of a signal output from the second amplifier 515, differentiates the signal, and supplies the signal to the second ADC 524.

The third differentiator 520 removes a DC component of a signal output from the third amplifier 516, differentiates the signal, and supplies the signal to the third ADC 525.

The fourth differentiator 521 removes a DC component of a signal output from the fourth amplifier 517, differentiates the signal, and supplies the signal to the fourth ADC 526.

Each of the first differentiator 518 to the fourth differentiator 521 removes a DC offset generated by a preceding stage, gives a differential characteristic, and improves a demodulation S/N ratio of a phase demodulator in which sensitivity thereof has a differential characteristic and which is arranged in a later stage. The first differentiator 518 to the fourth differentiator 521 may be constituted by first-order high-pass filters (HPFs)

The first ADC 523 restricts amplitude of a signal output from the first differentiator 518, and samples and quantizes the signal, and thereafter, supplies the signal to the first Hilbert transformer 527.

The second ADC 524 restricts amplitude of a signal output from the second differentiator 519, and samples and quantizes the signal, and thereafter, supplies the signal to the first delay circuit 529.

The third ADC 525 restricts amplitude of a signal output from the third differentiator 520, and samples and quantizes the signal, and thereafter, supplies the signal to the second Hilbert transformer 528.

The fourth ADC 526 restricts amplitude of a signal output from the fourth differentiator 521, and samples and quantizes the signal, and thereafter, supplies the signal to the second delay circuit 530.

As with the first embodiment, the first ADC 523 to the fourth ADC 526 are driven using an identical sampling clock CLK. The sampling clock CLK may be asynchronous with the RF. When an innermost circumference of an optical disc serving as a recording medium or a seeking start radius is denoted by ri, an outermost circumference or a seeking target radius is denoted by ro, and ro is larger than ri, the sampling frequency of the first ADC 523 to the fourth ADC 526 is preferably set so as to be 2×(ro/ri) times (4.8 times for 12-cm discs) higher than the RF maximum repetition frequency in the radius ri (2T=fcck/4 for Blu-ray discs, and 3T=fcck/6 for DVDs and CDs: fcck denotes a channel clock frequency).

The sampling frequency is set as described above so that a TE signal is properly detected when the full seeking operation is performed on the disc from the innermost circumference to the outermost circumference.

In this embodiment, the first ADC 523 to the fourth ADC 526 are replaceable by latched comparators.

The first Hilbert transformer 527 shifts a phase of the signal output from the first ADC 523 by 90 degrees irrespective of a cycle of a signal component and supplies a resultant signal to the first cross-correlator 533.

The first delay circuit 529 delays the signal output from the second ADC 524 by an amount of delay equal to that caused by the first Hilbert transformer 527, and supplies the signal to the first cross-correlator 533.

The second Hilbert transformer 528 shifts a phase of the signal output from the third ADC 525 by 90 degrees irrespective of a cycle of a signal component and supplies a resultant signal to the second cross-correlator 534.

The second delay circuit 530 delays the signal output from the fourth ADC 526 by an amount of delay equal to that caused by the second Hilbert transformer 528, and supplies the signal to the second cross-correlator 534.

The third delay circuit 531 delays a signal output from the summing circuit 532 by the amount of delay equal to that caused by the first Hilbert transformer 527 and the second Hilbert transformer 528, and supplies the signal to the autocorrelator 536.

The first delay circuit 529 to the third delay circuit 531 may be constituted by bandpass filters (BPFs) having amplitude frequency characteristics the same as those of the first Hilbert transformer 527 and the second Hilbert transformer 528.

Furthermore, as with the first and second embodiments, the first Hilbert transformer 527 and the second Hilbert transformer 528 may be constituted by FIR filters which output two different signals I (having an in-phase component) and Q (having a quadrature component) which have a quadrature relationship to each other.

Furthermore, a first FIR filter may be arranged instead of the Hilbert transformers, and a second FIR filter may be arranged instead of the BPFs serving as the delay circuits so that a signal output from the first FIR filter and a signal output from the second FIR filter have a phase difference of 90 degrees therebetween irrespective of a signal cycle.

In particular, the first FIR filter and the second FIR filter may be configured such that an amount of a phase shift of the first FIR filter is +45 degrees (or −45 degrees) irrespective of the signal cycle and an amount of a phase shift of the second FIR filter is −45 degrees (or +45 degrees) irrespective of the signal cycle.

The summing circuit 532 calculates a total sum of the signals output from the first ADC 523 to the fourth ADC 526. The signal output from the summing circuit 532 is supplied through the third delay circuit 531 to the autocorrelator 536.

The first cross-correlator 533 calculates a correlation coefficient CC1 representing a phase difference between the input RF signals using the signal output from the first Hilbert transformer 527 and the signal output from the first delay circuit 529, and outputs a resultant signal to the adder 535.

The second cross-correlator 534 calculates a correlation coefficient CC2 representing a phase difference between the input RF signals using the signal output from the second Hilbert transformer 528 and the signal output from the second delay circuit 530, and outputs a resultant signal to the adder 535.

The adder 535 adds the signal supplied from the first cross-correlator 533 to the signal supplied from the second cross-correlator 534, and supplies a resultant signal to the normalizer 538.

Note that the circuit shown in FIG. 6 may be employed as the first cross-correlator 533 and the second cross-correlator 534.

The autocorrelator 536 calculates an autocorrelation coefficient AC0 of the signal output from the summing circuit 532.

The autocorrelator 536 may be constituted by a multiplier and an integrator which accumulates and adds signals output from the multiplier and which holds and normalizes (divides) a result of the accumulation and addition using a fixity coefficient, for example.

The multiplier is replaceable by a balanced modulator or an exclusive-OR circuit.

The gain circuit 537 amplifies a signal output from the autocorrelator 536 using a predetermined gain, and supplies the amplified signal to the normalizer 538.

The gain circuit 537 multiplies the autocorrelation coefficient AC0 by an appropriate fixity coefficient (in this embodiment, 2 for BDs and CDs, and 4 for DVDs) selected in accordance with a type of medium (disc) to thereby generate an envelope signal ENV which is a square value of the total sum.

The normalizer 538 normalizes (divides) the signal output from the cross-correlator 536 using the envelope signal ENV obtained through the autocorrelator 536 and the gain circuit 537. Instead of the envelope signal ENV which is a square value of the total sum, an absolute value signal may be used for normalization.

The normalizer 538 may be basically constituted by an LUT (look up table) and multipliers. The normalizer 538 preferably includes a lower limiter for limiting a level of the envelope signal ENV so as to prevent zero division and divergence from occurring due to a signal defect.

Note that the circuit shown in FIG. 7 may be employed as the normalizer 538.

The DAC 539 converts a digital signal output from the normalizer 538 into an analog signal.

The LPF 540 smoothes the signal output from the DAC 539 so as to obtain a TE signal to be output.

Next, operation of the TE detection device 500 having the configuration described above will be described.

The light-receiving element 501 is divided into four light-receiving elements, i.e., the first divided light-receiving element 501-A to a fourth divided light-receiving element 501-D as described above. The first divided light-receiving element 501-A supplies the first RF signal RF1 to the first AC coupling unit 502. Similarly, the second divided light-receiving element 501-B supplies the fourth RF signal RF4 to the fourth AC coupling unit 505, the third divided light-receiving element 501-C supplies the third RF signal RF3 to the third AC coupling unit 504, and the fourth divided light-receiving element 501-D supplies the second RF signal RF2 to the second AC coupling unit 503.

The first AC coupling unit 502 to the fourth AC coupling unit 505 remove DC components included in the first RF signal RF1 to the fourth RF signal RF4 in which phase differences (time differences) among them change in accordance with tracking error signals output from the light-receiving element 101 included in the optical pickup, and supply the signals to the first GCA 506 to the fourth GCA 509.

The first GCA 506 controls a signal supplied from the first AC coupling unit 502 in accordance with variation of an output level of the light-receiving element 501 of the optical pickup (OPU), and supplies a resultant signal to the first AAF 510.

The second GCA 507 controls a signal supplied from the second AC coupling unit 503 in accordance with the variation of the output level of the light-receiving element 501 of the OPU, and supplies a resultant signal to the second AAF 511.

The third GCA 508 controls a signal supplied from the third AC coupling unit 504 in accordance with the variation of the output level of the light-receiving element 501 of the OPU, and supplies a resultant signal to the third AAF 512.

The fourth GCA 509 controls a signal supplied from the fourth AC coupling unit 505 in accordance with the variation of the output level of the light-receiving element 501 of the OPU, and supplies a resultant signal to the fourth AAF 513.

The first AAF 510 restricts an output band of the first GCA 506, prevents aliasing of out-of-band components, and supplies a resultant signal to the first amplifier 514 where the signal is amplified and supplied to the first differentiator 518.

The second AAF 511 restricts an output band of the second GCA 507, prevents aliasing of out-of-band components, and supplies a resultant signal to the second amplifier 515 where the signal is amplified and supplied to the second differentiator 519.

The third AAF 512 restricts an output band of the third GCA 508, prevents aliasing of out-of-band components, and supplies a resultant signal to the third amplifier 516 where the signal is amplified and supplied to the third differentiator 520.

The fourth AAF 513 restricts an output band of the fourth GCA 509, prevents aliasing of out-of-band components, and supplies a resultant signal to the fourth amplifier 517 where the signal is amplified and supplied to the fourth differentiator 521.

The first differentiator 518 removes a DC component of a signal output from the first amplifier 514, differentiates the signal, and supplies the signal to the first ADC 523.

The second differentiator 519 removes a DC component of a signal output from the second amplifier 515, differentiates the signal, and supplies the signal to the second ADC 524.

The third differentiator 520 removes a DC component of a signal output from the third amplifier 516, differentiates the signal, and supplies the signal to the third ADC 525.

The fourth differentiator 521 removes a DC component of a signal output from the fourth amplifier 517, differentiates the signal, and supplies the signal to the fourth ADC 526.

The first ADC 523 restricts the amplitude of a signal output from the first differentiator 518, and samples and quantizes the signal, and thereafter, supplies the signal to the first Hilbert transformer 527 as a digital signal.

Similarly, the second ADC 524 restricts the amplitude of a signal output from the second differentiator 519, and samples and quantizes the signal, and thereafter, supplies the signal to the first delay circuit 529 as a digital signal.

The third ADC 525 restricts the amplitude of a signal output from the third differentiator 520, and samples and quantizes the signal, and thereafter, supplies the signal to the second Hilbert transformer 528 as a digital signal.

The fourth ADC 526 restricts amplitude of a signal output from the fourth differentiator 521, and samples and quantizes the signal, and thereafter, supplies the signal to the second delay circuit 530 as a digital signal.

The first Hilbert transformer 527 shifts a phase of the signal output from the first ADC 523 by 90 degrees irrespective of a cycle of a signal component and supplies a resultant signal to the first cross-correlator 533.

The first delay circuit 529 delays the signal output from the second ADC 524 by an amount of delay equal to that caused by first Hilbert transformer 527, and supplies the signal to the first cross-correlator 533.

The second Hilbert transformer 528 shifts a phase of the signal output from the third ADC 525 by 90 degrees irrespective of a cycle of a signal component and supplies a resultant signal to the second cross-correlator 534.

The second delay circuit 530 delays the signal output from the fourth ADC 526 by an amount of delay equal to that caused by the second Hilbert transformer 528, and supplies the signal to the second cross-correlator 534.

Simultaneously, the summing circuit 532 calculates a total sum of the signal output from the first ADC 523 to the signal output from the fourth ADC 526. The signal output from the summing circuit 532 is supplied to the second delay circuit 120 which delays the signal by an amount of delay equal to that caused by the first Hilbert transformer 527 and the second Hilbert transformer 528. Thereafter, the signal is further supplied to the autocorrelator 536.

The first cross-correlator 533 calculates the correlation coefficient CC1 representing a phase difference between the input RF signals using the signal output from the first Hilbert transformer 527 and the signal output from the first delay circuit 529, and outputs a resultant signal to the adder 535.

The second cross-correlator 534 calculates the correlation coefficient CC2 representing a phase difference between the input RF signals using the signal output from the second Hilbert transformer 528 and the signal output from the second delay circuit 530, and outputs a resultant signal to the adder 535.

The adder 535 adds the signal output from the first cross-correlator 533 to the signal output from the second cross-correlator 534 and supplies a resultant signal to the normalizer 538.

The autocorrelator 536 calculates an autocorrelation coefficient AC0 of the signal output from the summing circuit 532 and the autocorrelation coefficient AC0 is supplied to the gain circuit 537.

The gain circuit 537 multiplies the autocorrelation coefficient AC0 by an appropriate fixity coefficient selected in accordance with a type of medium (disc) to thereby generate an envelope signal ENV which is a square value of the total sum, and the envelope signal ENV is supplied to the normalizer 538.

The normalizer 538 normalizes (divides) the signal output from the adder 535 using the envelope signal ENV obtained through the autocorrelator 536 and the gain circuit 537. Instead of the envelope signal ENV which is a square value of the total sum, an absolute value signal may be used for normalization.

Then, the DAC 539 converts a digital signal supplied from the normalizer 538 into an analog signal, and thereafter, the LPF 540 smoothes the signal so as to obtain a TE signal to be output.

That is, the digital signal output from the normalizer 538 is converted into an analog signal using the DAC 539, and is smoothed using the LPF 540 (post filter). Thereafter, an image component in the signal is removed and the signal is supplied as a DPD tracking error signal TEout to a tracking servo control device (not shown).

According to the third embodiment, the TE detection device employing the DPD method is realized as a digital circuit which operates at high speed with high accuracy. Advantages of the TE detection device will be described in detail hereinafter.

Fourth Embodiment

Figure 15:
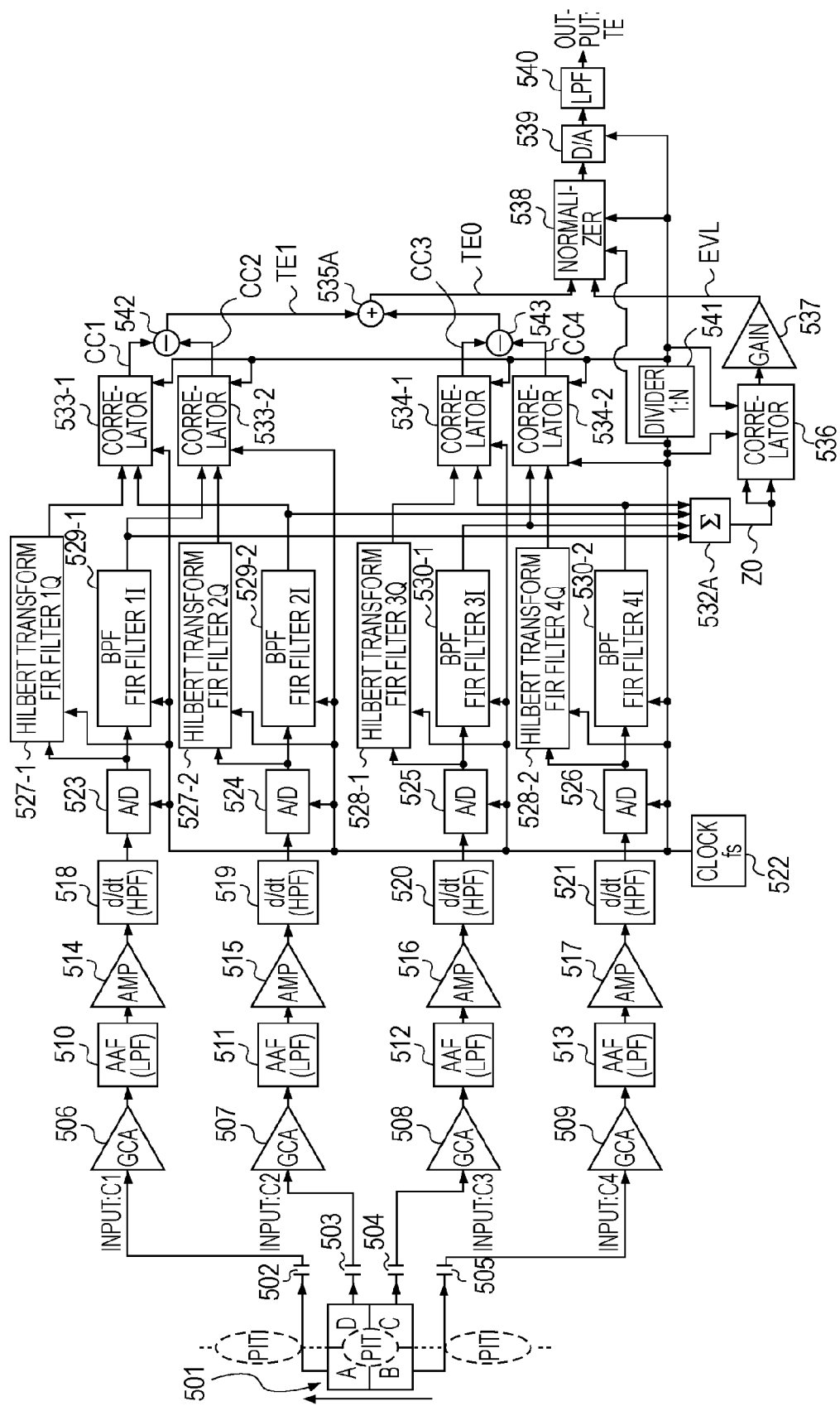
FIG. 15 is a circuit diagram illustrating a configuration example of a tracking error (TE) detection device employing a DPD method according to a fourth embodiment of the present invention.

FIG. 15 is a circuit diagram illustrating a configuration example of a tracking error (TE) detection device employing a DPD method according to a fourth embodiment of the present invention.

A TE detection device 500A according to the fourth embodiment is different from the TE detection device 500 according to the third embodiment in the following points.

A first ADC 523 is connected at an output terminal thereof to an 11th Hilbert transformer 527-1 and an 11th delay circuit 529-1, and a second ADC 524 is connected at an output terminal thereof to a 12th Hilbert transformer 527-2 and a 12th delay circuit 529-2.

Furthermore, the 11th Hilbert transformer 527-1 and the 12th delay circuit 529-2 are connected to an 11th cross-correlator 533-1 which calculates the correlation between a signal output from the 11th Hilbert transformer 527-1 and a signal output from the 12th delay circuit 529-2. Moreover, the 12th Hilbert transformer 527-2 and the 11th delay circuit 529-1 are connected to a 12th cross-correlator 533-2 which calculates the correlation between a signal output from the 12th Hilbert transformer 527-2 and a signal output from the 11th Hilbert delay circuit 529-1.

Similarly, a third ADC 525 is connected at an output terminal thereof to a 21st Hilbert transformer 528-1 and a 21st delay circuit 530-1, and a fourth ADC 526 is connected at an output terminal thereof to a 22nd Hilbert transformer 528-2 and a 22nd delay circuit 530-2.

Furthermore, the 21st Hilbert transformer 528-1 and the 22nd delay circuit 530-2 are connected to a 21st cross-correlator 534-1 which calculates the correlation between a signal output from the 21st Hilbert transformer 528-1 and a signal output from the 22nd delay circuit 530-2. Moreover, the 22nd Hilbert transformer 528-2 and the 21st delay circuit 530-1 are connected to a 22nd cross-correlator 534-2 which calculates the correlation between a signal output from the 22nd Hilbert transformer 528-2 and a signal output from the 21st delay circuit 530-1.

Furthermore, the 11th cross-correlator 533-1 and the 12th cross-correlator 533-2 are connected to a subtractor 542 which performs a subtraction operation so as to obtain a difference value between a signal output from the 11th cross-correlator 533-1 and a signal output from the 12th cross-correlator 533-2. Similarly, the 21st cross-correlator 534-1 and the 22nd cross-correlator 534-2 are connected to a subtractor 543 which performs a subtraction operation so as to obtain a difference value between a signal output from the 21st cross-correlator 534-1 and a signal output from the 22nd cross-correlator 534-2.

Then, an adder 535A adds a signal supplied from the subtractor 542 to a signal supplied from the subtractor 543, and supplies a resultant signal to a normalizer 538.

A summing circuit 532A calculates a total sum of a signal output from the 11th delay circuit 529-1, a signal output from the 12th delay circuit 529-2, a signal output from the 21st delay circuit 530-1, and a signal output from the 22nd delay circuit 530-2.

In this case, each of a pair of the eleventh Hilbert transformer 527-1 and the 11th delay circuit 529-1, a pair of the 12th Hilbert transformer 527-2 and the 12th delay circuit 529-2, a pair of the 21st Hilbert transformer 528-1 and the 21st delay circuit 530-1, and a pair of the 22nd Hilbert transformer 528-2 and the 22nd delay circuit 530-2 may be constituted by a single FIR filter which has two independent TAP leading lines which are interleaved in a comb-like shape as shown in FIG. 9 and output terminals (I and Q). Accordingly, the size of the circuit is reduced.

In the fourth embodiment, the first ADC 523 to the fourth ADC 526 supply the signals to the pair of the 11th Hilbert transformer 527-1 and the 11th delay circuit 529-1, the pair of the 12th Hilbert transformer 527-2 and the 12th delay circuit 529-2, the pair of the 21st Hilbert transformer 528-1 and the 21st delay circuit 530-1, and the pair of the 22nd Hilbert transformer 528-2 and the 22nd delay circuit 530-2, respectively. Each of the Hilbert transformers and the delay circuits is constituted by a FIR filter which outputs two different signals I and Q which have a quadrature relationship with each other.

Then, the Hilbert transformers and the FIR filters having bandpass-filter characteristics supply signals to the corresponding cross-correlators.

As described above, since in an amplitude characteristic of each of the FIR filters, the both signals I and Q have bandpass characteristics, amounts of transmission of a DC frequency component and a Nyquist frequency (fs/2) component are zero. Therefore, a DC shift component (a shift of a center of a TE signal) which is caused by amplitude restriction and which is generated in correlation as a result of a correlation calculation of this embodiment is normally zero. Accordingly, as described above, over-scale limit effects are utilized and A/D converters having a small number of quantization bits are attained.

The 11th cross-correlator 533-1 and the 12th cross-correlator 533-2 supply correlation coefficients CC1 and CC2, respectively, to the subtractor 542 which performs a subtraction operation using the correlation coefficients CC1 and CC2, and a resultant signal is output from the subtractor 542 as a tracking error signal TE1.

Each of the FIR filters performs a complementary calculation on the signals I and Q, and therefore, an expectation of the correlation coefficient CC1 is equal to an expectation of the correlation coefficient CC2, and a polarity of the correlation coefficient CC1 is opposite to a polarity of the correlation coefficient CC2.

On the other hand, residues (noise components) of integrations of the 11th cross-correlator 533-1 and the 12th cross-correlator 533-2 have a phase difference of 90 degrees therebetween, and are uncorrelated with each other. Accordingly, when a differential synthesizing operation is performed using the correlation coefficients CC1 and CC2, a twofold TE component and a $\sqrt{2}$-fold noise component are obtained and an S/N ratio of the TE signal is improved by 3 dB.

Similarly, the 21st cross-correlator 534-1 and the 22nd cross-correlator 534-2 supply correlation coefficients CC3 and CC4, respectively, to the subtractor 543 which performs a subtraction operation using the correlation coefficients CC3 and CC4, and a resultant signal is output from the subtractor 543 as a tracking error signal TE2.

Accordingly, when a differential synthesizing operation is performed using the correlation coefficients CC3 and CC4, a twofold TE component and a $\sqrt{2}$-fold noise component are obtained and an S/N ratio of the TE signal is improved by 3 dB.

The adder 535A adds the tracking error signals TE1 and TE2 to each other and outputs a resultant signal as a tracking error signal TE0 (calculation: TE0=TE1+TE2). This calculation may be a subtraction in accordance with an input connection. With this operation, a shift of the origin (track offset) in accordance with a pit depth of a medium and a lens shift of an OPU is cancelled.

Note that in this embodiment, the operation is performed starting from a correlation calculation (multiplication and integration) followed by an addition/subtraction. However, the operation may be performed starting from a multiplication, followed by an addition/subtraction, and integration.

Since multipliers are used for correlation detection, output sensitivities relative to RF input amplitudes have square-law characteristics. Since the sensitivities are affected by deterioration of a frequency characteristic due to an optical transmission function of the OPU, for example, variations of the amplitudes are not suppressed only using over-scale limit effects of signals supplied to the ADCs. Therefore, the tracking error signal TE0 is preferably normalized in input signal levels of the cross-correlators in order to eliminate the influence of the amplitude variation.

The summing circuit 532A calculates a total sum using signals I1, I2, I3, and I4 (or Q1, Q2, Q3, and Q4) output from the FIR filters (the 11th delay circuit 529-1, the 12th delay circuit 529-2, the 21st delay circuit 530-1, and the 22nd delay circuit 530-2) so as to generate a total sum signal Z0.

The total sum signal Z0 is supplied to an autocorrelator 536 which calculates an autocorrelation coefficient AC0. A gain circuit 537 multiplies the autocorrelation coefficient AC0 by an appropriate fixity coefficient (in this embodiment, 2 for BDs and CDs, and 4 for DVDs) in accordance with a type of medium (disc) to thereby generate an envelope signal ENV which is a square value of the total sum. The normalizer 538 normalizes the tracking error signal TE0 using the envelope signal ENV (calculation: TE=TE0/ENV). Since this calculation is performed as a digital operation, the division is readily performed.

A DAC 539 converts a signal output from the normalizer 538 into an analog signal, and a LPF (post filter) 540 smoothes the analog signal and removes an image component from the signal. Thereafter, the LPF 540 supplies a resultant signal as a DPD tracking error signal TEout to a tracking servo control device (not shown).

Note that although the normalizer is arranged in the foregoing embodiment, instead of the normalizer, a method for transmitting the tracking error signal TE0 which has not yet been normalized and the envelope signal ENV to a servo system and performing normalization using a DSP (digital signal processing) unit included in the tracking servo control device may be employed.

Note that when amplitude or an f-characteristic is small, for example, the normalization may be omitted.

Furthermore, TAP coefficients of the Hilbert filters and bandpass filters (BPFs) are not limited to those shown in FIGS. 10 to 13. For example, the TAP coefficients of the Hilbert filters may be set to [0, 1, 0, −1, 0] (or [0, −1, 0, 1, 0]) and the TAP coefficients of the bandpass filters may be set to [−1, 0, 2, 0, −1].

Moreover, in a case where an A/D converter with higher resolution is used, the over-scale limit effects are not necessarily used but digital limiters may be additionally arranged after the A/D converters.

In addition, the TE signal or the tracking error signal TE0 and the envelope signal ENV may be transmitted to the tracking servo control device as a digital signal or digital signals without being converted into an analog signal.

According to the first to fourth embodiments, the following effects are obtained.

(1) Since, instead of a configuration of a digital DPD circuit in the related art including an A/D converter, a compensation unit, a high-frequency boost circuit, and an edge (zero-cross) comparison type phase comparator which results in an analog high-frequency boost circuit having a large circuit size and high element sensitivity, a configuration of a DPD circuit including A/D converters, one or more Hilbert transformers, and one or more correlation detection type phase comparators is employed, each of the phase comparators operates with high reliability and at high speed, and the number of quantization bits of each of the A/D converters is reduced.

(2) Since each of the Hilbert transformers according to the effect (1) is realized by a fully digital system including an A/D converter and first and second FIR digital filters (the first FIR digital filter corresponds to a Hilbert transformer and the second FIR digital filter corresponds to a delay circuit or a BPF), errors and drifts are avoided and a 90-degree relative phase difference is accurately attained irrespective of a signal cycle in a range from a DC frequency (0 Hz) to a Nyquist frequency (fs/2).

(3) Each of the correlation detection type phase comparators according to the effect (1) is constituted by a digital multiplier and an integral-and-dump integrator (including accumulator and an S and H (sample and hold) circuit). Since integration detection is performed, unlike general edge comparison type phase comparators, a false-edge removing mechanism utilizing asynchronous feedback loop is not necessary. Therefore, quantitative timing control (static timing analysis: STA) utilizing a fully synchronization design is achieved and a phase comparator operating at high speed is realized.

(4) Each of the Hilbert transformers according to the effect (2) basically has a bandpass characteristic in which frequency characteristics at DC frequency (0 Hz) and a Nyquist frequency (fs/2) are zero. Therefore, when a TE detection circuit employing a DPD method is configured using the one or more Hilbert transformers and the one or more correlation detection type phase comparators according to the effect (3), demodulation DC components other than that in the TE signal are principally zero. Accordingly, even when amplitude is restricted before a signal is supplied to one of the A/D converters, shift (offset) of the origin of the TE signal is not generated. Consequently, the number of quantization bits of each of the A/D converters is reduced using an over-scale limit effect.

(5) Since the over-scale limit effect of each of the A/D converters is utilized as described in the effect (4), the number of quantization bits is reduced (1 bits to 4 bits) and a circuit size is reduced, and furthermore, a digital DPD circuit which is less influenced by a square-law characteristic of TE sensitivity relative to amplitude which is an disadvantage of the correlation detection type phase comparator according to the effect (3) is attained.

(6) Since the TE signal is normalized using an envelope signal which is a square value of the total sum of signals output from A/D converters or signals output from FIR filters or using an absolute value signal, a digital DPD circuit which is not affected by the square-law characteristic of TE sensitivity generated due to the deterioration of the f-characteristic is realized in a high-density optical disc device.

(7) Since a sampling frequency of the A/D converters is set to a frequency 4.8 times or more larger than a maximum repetition frequency of an RF signal at an innermost circumference of a disc, deterioration of the TE sensitivity at an outer circumference due to influence of a reverse-phase component generated due to aliasing of the RF signal is avoided, and a traverse TE signal is properly detected when the full seeking operation is performed on the disc from the innermost circumference to the outermost circumference.

(8) Since a first pair of a Hilbert transformer and a correlation detection type phase comparator and a second pair of a Hilbert transformer and a correlation detection type phase comparator are complementarily implemented and a differential synthesis operation is performed on signals output from the both pairs, an S/N ratio of the TE signal is improved.

(9) Since each of the first FIR digital filter (Hilbert transformer) and the second FIR digital filter (delay circuit or BPF) are constituted by a single FIR filter which has two independent TAP leading lines which are interleaved in a comb-like shape as shown in FIG. 9 and output terminals (I and Q), the sizes of the FIR filters are reduced to half.

Note that the TE detection devices described above are applicable to optical recording/reproducing apparatuses (optical disc apparatuses) such as Blu-ray disc apparatuses using a semiconductor laser of a 400-nm band.

Figure 16:
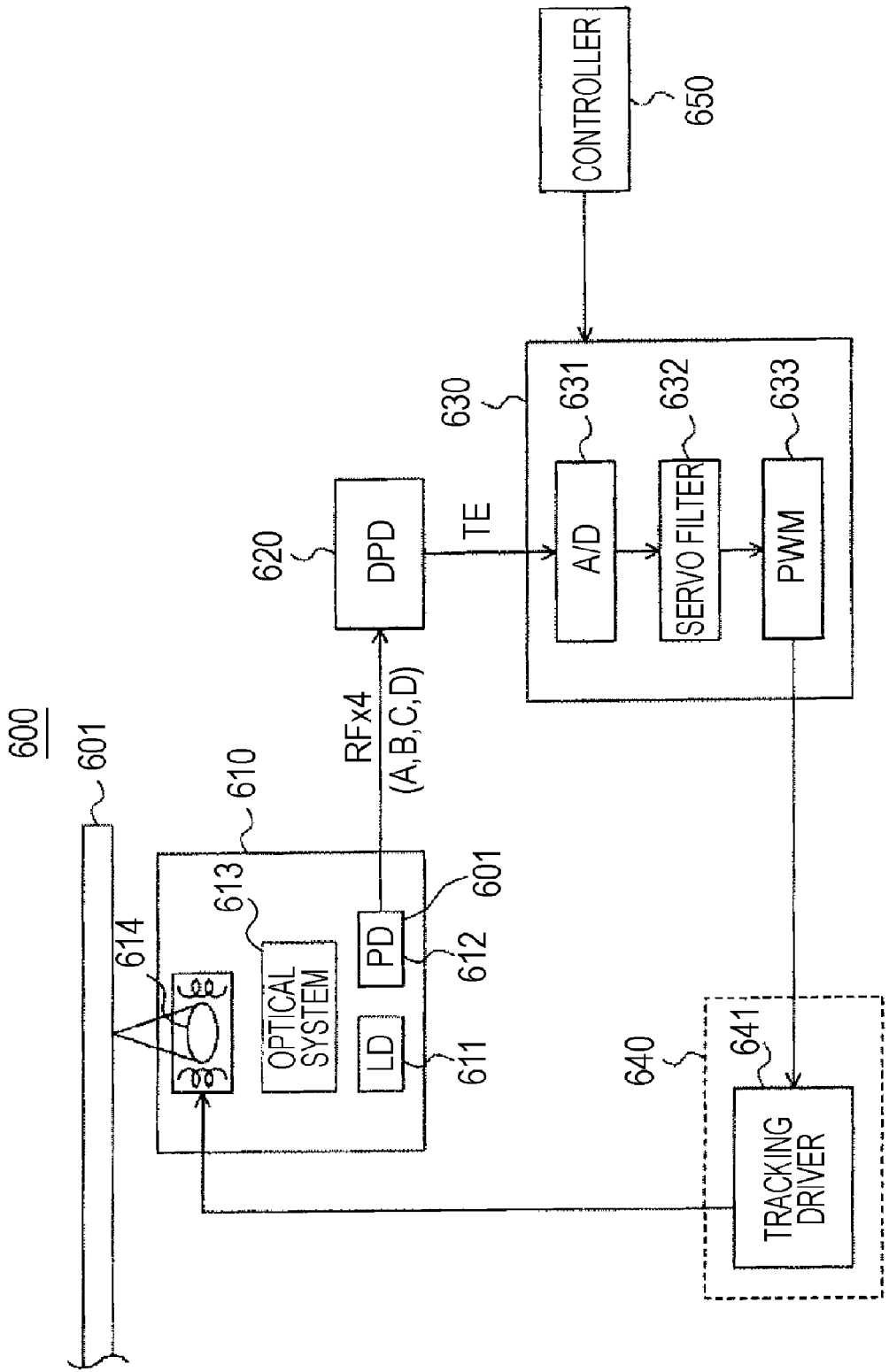
FIG. 16 is a diagram illustrating a configuration example of an optical recording/reproducing apparatus to which one of the TE detection devices according to the embodiments of the present invention is applicable.

FIG. 16 is a diagram illustrating a configuration example of an optical recording/reproducing apparatus to which one of the TE detection devices according to the embodiments of the present invention is applicable.

An optical recording/reproducing apparatus 600 includes a recording medium (for example, an optical disc 601), an optical pickup (optical head) 610, a TE detection device 620 employing a DPD method, a servo controller 630, a driving circuit 640, and a system controller 650.

The optical head 610 includes a laser diode 611 which is driven by a laser driving circuit and which is used to record and reproduce digital data, a light-receiving element 612 which detects a laser beam emitted from the laser diode 611, an optical system 613, and an objective lens 614.

The light-receiving element 612 corresponds to the light-receiving elements 101 or 501.

The DPD type TE detection device 620 corresponds to the TE detection devices 100, 100A, 500, or 500A according to the first to fourth embodiments.

The servo controller 630 includes an ADC 631 which converts an analog TE signal supplied from the TE detection device 620 into a digital signal under the control of the system controller 650, a servo filter 632, and a PWM (pulse-width modulation) circuit 633 which performs a PWM control on the driving circuit 640. Note that a processing system for a focus error signal is omitted in FIG. 16.

The driving circuit 640 has a tracking driver 641 which drives a tracking mechanism of the objective lens 614.

Note that this optical recording/reproducing apparatus is merely an example, and optical recording/reproducing apparatus to which the present invention is applied is not limited to the optical recording/reproducing apparatus having a configuration shown in FIG. 16.

It should be understood by those skilled in the art that various modifications, combinations, sub-combinations and alterations may occur depending on design requirements and other factors insofar as they are within the scope of the appended claims or the equivalents thereof.

What is claimed is:

1. A tracking error signal detection device employing a differential phase detection method, comprising:
   first and second differentiators which remove direct current components included in first and second signal groups in which a phase difference between the first and second signal groups changes in accordance with a tracking error signal, and which differentiate the first and second signal groups;
   a first analog/digital converter which samples and quantizes a signal output from the first differentiator;
   a second analog/digital converter which samples and quantizes a signal output from the second differentiator;
   a Hilbert transformer which performs a 90-degree phase shift on a signal output from the first analog/digital converter or a signal output from the second analog/digital converter irrespective of a cycle of a signal component;
   a delay circuit which delays the signal output from the second analog/digital converter or the signal output from the first analog/digital converter by an amount of delay equal to that caused by the Hilbert transformer; and
   a phase comparator which calculates a phase difference between a signal output from the Hilbert transformer and a signal output from the delay circuit.

2. The tracking error signal detection device according to claim 1, further comprising:
   first to fourth AC coupling units which remove direct current components included in first to fourth RF signals in which phase differences among the first to fourth RF signals change in accordance with the tracking error signal;
   a first adder which generates the first signal group by adding a signal output from the first AC coupling unit and to a signal output from the third AC coupling unit;
   a second adder which generates the second signal group by adding a signal output from the second AC coupling unit to a signal output from the fourth AC coupling unit;
   first and second gain control amplifiers which control signals output from the first and second adders in accordance with variation of a level of a signal output from an optical head;
   a first anti-aliasing filter which restricts an output band of the first gain control amplifier and which prevents aliasing of out-of-band components;
   a second anti-aliasing filter which restricts an output band of the second gain control amplifier and which prevents aliasing of out-of-band components;
   a first amplifier which amplifies a signal output from the first anti-aliasing filter to a predetermined level and which supplies the signal to the first differentiator; and
   a second amplifier which amplifies a signal output from the second anti-aliasing filter to a predetermined level and which supplies the signal to the second differentiator.

3. The tracking error signal detection device according to claim 2, wherein when an innermost circumference of an optical disc serving as a recording medium or a seeking start radius is denoted by ri, an outermost circumference or a seeking target radius is denoted by ro, and ro is larger than ri, cutoff frequencies of the first and second anti-aliasing filters are set so as to be ro/ri times higher than an RF maximum repetition frequency.

4. The tracking error signal detection device according to claim 2, wherein cutoff frequencies of the first and second anti-aliasing filters are set so as to be 2.4 times higher than an RF maximum repetition frequency.

5. The tracking error signal detection device according to claim 2, wherein predetermined gains of the first and second amplifiers are set so that over-scale limit effects are attained in the first and second analog/digital converters.

6. The tracking error signal detection device according to claim 5, wherein,
   the first and second analog/digital converters are driven in accordance with an identical sampling clock which is asynchronous with the input RF signals, and
   when an innermost circumference of an optical disc serving as a recording medium or a seeking start radius is denoted by ri, an outermost circumference or a seeking target radius is denoted by ro, and ro is larger than ri, a frequency of the sampling clock is set so as to be 2 times (ro/ri) times higher than an RF maximum repetition frequency.

7. The tracking error signal detection device according to claim 5, wherein,.

the first and second analog/digital converters are driven in accordance with an identical sampling clock which is asynchronous with the input RF signals, and a frequency of the sampling clock is set so as to be 4.8 times higher than an RF maximum repetition frequency.

8. The tracking error signal detection device according to claim 1, wherein the delay circuit includes a bandpass filter.

9. The tracking error signal detection device according to claim 8, wherein the bandpass filter has an amplitude frequency characteristic the same as that of the Hilbert transformer.

10. The tracking error signal detection device according to claim 1, wherein,.

the Hilbert transformer includes a first finite impulse response (FIR) filter, the delay circuit includes a second FIR filter, and a phase difference between a signal output from the first FIR filter and a signal output from the second FIR filter is 90 degrees irrespective of a signal cycle.

11. The tracking error signal detection device according to claim 10, wherein,.

an amount of a phase shift of the first FIR filter is +45 degrees or −45 degrees irrespective of the signal cycle, and an amount of a phase shift of the second FIR filter is −45 or +45 irrespective of the signal cycle.

12. The tracking error signal detection device according to claim 1, wherein the phase comparator is a cross-correlator.

13. An optical disc apparatus including an optical disc recording medium, comprising:

a tracking error signal detection device employing a differential phase detection (DPD) method which detects a tracking error signal from reflection light information of light irradiated on the optical recording medium, wherein the tracking error signal detection device includes, first and second differentiators which remove direct current components included in first and second signal groups in which a phase difference between the first and second signal groups changes in accordance with the tracking error signal, and which differentiate the first and second signal groups;

a first analog/digital converter which samples and quantizes a signal output from the first differentiator;

a second analog/digital converter which samples and quantizes a signal output from the second differentiator;

a Hilbert transformer which performs a 90-degree phase shift on a signal output from the first analog/digital converter or a signal output from the second analog/digital converter irrespective of a cycle of a signal component;

a delay circuit which delays the signal output from the second analog/digital converter or the signal output from the first analog/digital converter by an amount of delay equal to that caused by the Hilbert transformer; and a phase comparator which calculates a phase difference between a signal output from the Hilbert transformer and a signal output from the delay circuit.

* * * * *